(12) United States Patent
Komatsu et al.

(10) Patent No.: US 9,513,479 B2
(45) Date of Patent: Dec. 6, 2016

(54) VIRTUAL IMAGE DISPLAY APPARATUS

(71) Applicant: SEIKO EPSON CORPORATION, Tokyo (JP)

(72) Inventors: Akira Komatsu, Tatsuno-machi (JP); Takahiro Totani, Suwa (JP); Masayuki Takagi, Matsumoto (JP); Takashi Takeda, Suwa (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 247 days.

(21) Appl. No.: 14/555,133

(22) Filed: Nov. 26, 2014

(65) Prior Publication Data

US 2015/0153575 A1 Jun. 4, 2015

(30) Foreign Application Priority Data

Dec. 3, 2013 (JP) ................. 2013-249857

(51) Int. Cl.
*H04N 9/47* (2006.01)
*G02B 27/01* (2006.01)

(52) U.S. Cl.
CPC ..... *G02B 27/0172* (2013.01); *G02B 2027/015* (2013.01); *G02B 2027/0178* (2013.01)

(58) Field of Classification Search
CPC ............ G02B 27/0172; G02B 2027/015; G02B 2027/0178

USPC ............................................. 348/54
See application file for complete search history.

(56) References Cited

U.S. PATENT DOCUMENTS

| 5,909,325 | A | 6/1999 | Kuba et al. |
| 7,345,822 | B1 | 3/2008 | Yamazaki |
| 2012/0200477 | A1* | 8/2012 | Fujishiro ............ G02B 27/0172 345/8 |
| 2013/0033756 | A1 | 2/2013 | Spitzer et al. |
| 2013/0182317 | A1 | 7/2013 | Takahashi |
| 2014/0159995 | A1* | 6/2014 | Adams ..................... G02C 5/16 345/8 |

FOREIGN PATENT DOCUMENTS

| JP | A-7-333551 | 12/1995 |
| JP | A-9-73043 | 3/1997 |
| JP | A-2005-17775 | 1/2005 |
| JP | A-2012-58302 | 3/2012 |

* cited by examiner

*Primary Examiner* — Allen Wong
(74) *Attorney, Agent, or Firm* — Oliff PLC

(57) ABSTRACT

With respect to an emitting side optical axis, which is an optical axis on a first surface, a sight line reference axis which is assumed as a sight line axis of the eyes of an observer extends in a slightly inclined direction. In particular, the emitting side optical axis with respect to the sight line reference axis is configured to approach the eyes from the outside (that is, a corner of the eyes) of the eyes. In addition, a long image in a vertical direction which is perpendicular to an alignment of the eyes rather than in the horizontal direction which corresponds to the alignment of the eyes, is displayed.

10 Claims, 15 Drawing Sheets

VIRTUAL IMAGE DISPLAY APPARATUS

BACKGROUND

1. Technical Field

The present invention relates to a virtual image display apparatus which presents a video formed by an image display element or the like to an observer, and particularly relates to a virtual image display apparatus which is appropriate to a head-mounted display which is mounted on the head of the observer.

2. Related Art

Various technologies have been suggested as an optical system which is embedded in a virtual image display apparatus, such as a head-mounted display (hereinafter, referred to as an HMD), which is mounted on the head of an observer (refer to US Patent Application No. 2013-0033756, JP-A-7-333551, JP-A-9-73043, JP-A-2012-58302, JP-A-2005-17775).

In the HMD in the related art, as an apparatus which presents a video to both eyes, a type which blocks external light or a see-trough type which presents a video by using a half mirror as a transparent member and overlapping the external light and video light, is employed (for example, refer to US Patent Application No. 2013-0033756). In the various types of HMD, when the apparatus is used for thoroughly watching a video, it is appropriate to present the image having a long horizontal length in a horizontal direction along the eyes of the observer. Therefore, in most cases, the apparatus presents a horizontally long image.

Meanwhile, as in a case of seeing the presented data while working on something else, the observer does not watch the video thoroughly. When the apparatus is used for so-called watching the video while doing something else, it is desirable to have a small size and a light weight, and an apparatus is known which is designed to be small and light without forming an intermediate image (for example, refer to JP-A-7-333551 and JP-A-9-73043). In addition, since it is necessary to reduce the size and the weight, an apparatus is known which is for one eye, and further, which has a small display portion (for example, refer to JP-A-2012-58302). However, in the one eye type apparatus, for example, there is a possibility that shielding of the front of the eyes due to the video can be reduced when performing some operations while seeing the display of information. However, the size of a display screen is limited by the request for the small size and the light weight, and there is a possibility that the information amount which can be displayed is not sufficient. In addition, even in one eye type apparatus, for example, an apparatus is known which uses a small-sized prism of an aspherical surface and which disposes the video element above the eyes (refer to JP-A-2005-17775), as an optical element which guides the video light to the eyes. In this case, the entire apparatus becomes large, and it is difficult to design the apparatus.

SUMMARY

An advantage of some aspects of the invention is to provide a virtual image display apparatus which can display abundant information in a small size and a light weight.

An aspect of the invention is directed to a virtual image display apparatus which allows at least any one of the right and the left eyes of the observer to view a virtual image, and includes: a video element which generates video light; and a light guiding member which guides the video light from the video element toward the eyes of the observer, in which the light guiding member, regarding a display range of the virtual image to be viewed, makes a width in a vertical direction which is perpendicular to a horizontal direction that corresponds to an alignment of the eyes greater than a width in the horizontal direction, and when a central axis of a ray of light, which is generated from the center of the video element, passes through the light guiding member, and reaches the center of the pupil (pupil center) of the observer, is considered as the optical axis, and when an axis which passes through the pupil center of the observer and is parallel to a front view direction of the face is considered as the sight line reference axis, the optical axis is in a state of being inclined on a corner of the eyes side of the observer rather than the sight line reference axis. Here, a direction of the optical axis with respect to the sight line reference axis means a direction when the light passes through the light guiding member and reaches the pupil center of the observer (that is, when the light is emitted from a light emitting surface of the light guiding member).

In the virtual image display apparatus, it is possible to display the image in a state where the display range of the virtual image which is viewed based on the video light from the video element is biased to the corner of the eyes side of the observer. Accordingly, for example, when the apparatus is used for so-called watching the video while doing something else, that is, the image is viewed while working on something else as necessary, it is possible to provide information by the video while controlling the shielding of a viewing field of the observer. Furthermore, the image displayed by the above-described virtual image display apparatus is made to be long (vertically long image) in the vertical direction which is perpendicular to the horizontal direction which corresponds to the alignment of the eyes. Accordingly, even when there is a request for a small size and a light weight, it is possible to maintain the display screen to be relatively large, and to make it easy to have a sufficient information amount be displayed.

In a specific aspect of the invention, the light guiding member emits the video light from an angle and a position at which an angle formed by the optical axis with respect to the sight line reference axis is 5° or greater and 30° or less. In this case, the image can be appropriately in a state of being shifted to an outside further outward than the center of the viewing field, the shielding of the viewing field due to the video while the observer observes the environment can be controlled, and it is possible to immediately receive the information provided by the video when the sight line faces the outside.

In another aspect of the invention, the optical axis which reaches the pupil center from the center of the video element is included in one plane, and the entire optical system including the video element and the light guiding member is in a symmetrical shape with respect to the plane. Here, the plane including the optical axis means a reference surface in the optical system of the light guiding member or the like. The symmetrical form with respect to the symmetrical plane means that a part having a substantial optical performance in the entire optical system is in a symmetrical form with respect to the reference surface. In general, when the small size and the light weight are strongly required, the size of the display screen is limited, and the information amount which can be displayed according to this is limited. For example, in the above-described light guiding member, when the video light is guided along a direction parallel to the symmetrical plane, a large size of the apparatus which has a thick light guiding member is necessary to make the display range wide in the direction parallel to the symmetrical plane with respect to the virtual image to be viewed. In contrast, as a long side of the video element is in state of being perpendicular to the symmetrical plane by being extended in parallel to the vertical direction, that is, as a width of the video element is shortened in the direction along the symmetrical plane, it is possible to maintain a thin light guiding member according to the request for the small size, and to display much information. Furthermore, as the video light which is emitted from the video element via the light guiding member may be enlarged and displayed to the observer on a divergent type optical path which does not form an intermediate image, it is possible to shorten the entire optical path compared to a case where the intermediate image is formed, and to provide a compact configuration.

In still another aspect of the invention, a posture with respect to the observer of the entire optical system including the video element and the light guiding member is integrally changed, and a posture adjustment portion which adjusts an angle and a position of the video light emitted from the light guiding member is further provided. In this case, it is possible to adjust the display range of the virtual image to be in an appropriate state for the observer.

In yet another aspect of the invention, the light guiding member has a plurality of surfaces which contributes to guiding the video light, a first surface and a third surface among the plurality of surfaces are disposed to face each other, and after the video light from the video element is totally reflected on the third surface, is totally reflected on the first surface, and is reflected on a second surface, the video light transmits the first surface and reaches an observation side. As shapes of each surface at least from the first surface to the third surface that constitutes the surfaces are appropriately set, for example, it is possible to sufficiently correct the aberration of the video light from the video element.

In still yet another aspect of the invention, the light guiding member allows the video light and the external light to be viewed in an overlapped manner. In this case, the observer can observe the external light in a see-through manner. At this time, for example, when a prism in a rectangular parallelepiped shape is used as the light guiding member, in particular, when the surface which constitutes a part in front of the eyes is configured by a pair of parallel planes, it is possible not to generate any defocusing or distortion of the external light.

In further another aspect of the invention, the half mirror is formed on the second surface, the video light is presented to the observer, a light transmission member is disposed to be integrated on an outside of the second surface, a visibility with respect to the external light is approximately zero, and the external light and the video light are overlapped and presented to an observer. In this case, even when the first surface and the third surface are curved surfaces, by appropriately setting the shapes thereof, it is possible to reduce the defocusing and the distortion of the external light observed through the second surface.

In still further another aspect of the invention, a reflecting mirror is formed on the second surface, the video light is presented to the observer, the external light is blocked by the reflecting mirror, and only the video light is presented to the observer without disposing the light transmission member on the outside of the second surface, for example. In this case, since the external light and the video light are not overlapped, it is possible to present the video light having excellent contrast. In addition, since it is possible to block the external light with only one eye of the observer, it is always possible to allow the observer to view the environment by the other eye.

In yet further another aspect of the invention, the light guiding member includes: a splitter portion which transmits and reflects at least a part of the video light from the video element; and a light collecting mirror portion which collects the video light via the splitter portion and folds back the video light to the splitter portion, and the light guiding member emits the video light via the splitter portion and the light collecting mirror portion to an observer side. In this case, as the splitter portion and the light collecting mirror portion are provided inside the light guiding member, it is possible to employ a relatively simple structure while maintaining a small size and a light weight of the entire apparatus by setting the optical path to be in a desired range. In addition, for example, if the light guiding member is configured to have at least one correction lens surface, even when the display apparatus has a simple structure, it is possible to reduce a chromatic aberration of magnification or the like of the video light, and to display an image having a high performance.

In still yet further another aspect of the invention, the optical system including the light guiding member covers a part in front of the eyes of the observer when the apparatus is mounted, and allows a part in which the front of the eyes is not covered to exist.

In a further aspect of the invention, the video element includes: a signal light forming portion which emits modulated signal light corresponding to the image; and a scanning optical system which emits the signal light which is incident from the signal light forming portion as scanning light by scanning the signal light.

BRIEF DESCRIPTION OF THE DRAWINGS

The invention will be described with reference to the accompanying drawings, wherein like numbers reference like elements.

DESCRIPTION OF EXEMPLARY
EMBODIMENTS

Hereinafter, with reference to FIG. 1 or the like, a first embodiment of a virtual image display apparatus according to the invention will be described in detail.

Figure 1:
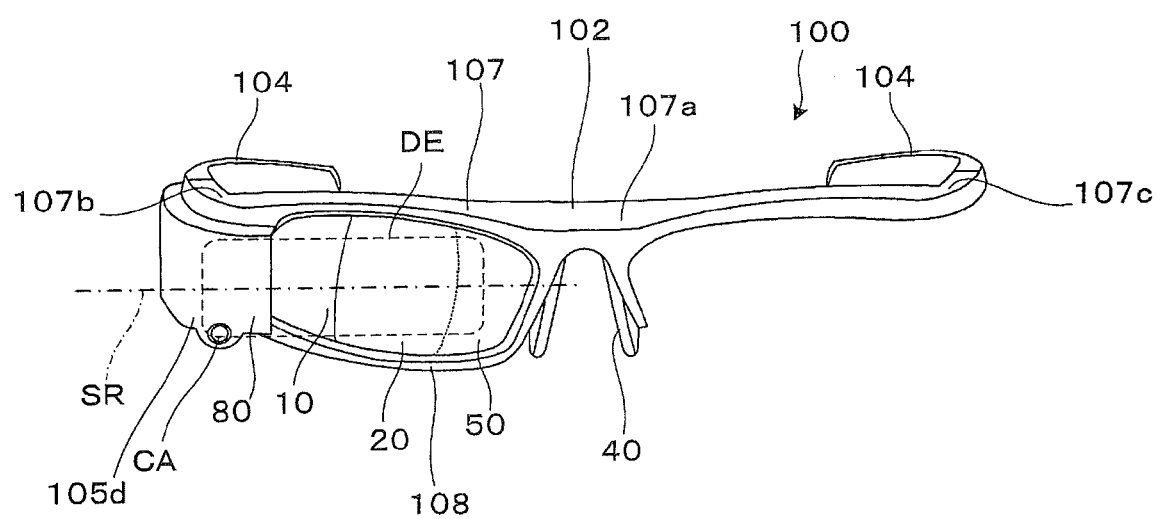
FIG. 1 is a front view illustrating a state of an external appearance of a virtual image display apparatus according to a first embodiment.

As illustrated in FIG. 1, a virtual image display apparatus 100 of the embodiment is a head-mounted display having an external appearance like glasses, and includes: an image display device 80 which forms image light (video light); and a light guiding device 20 which guides the video light emitted from the image display device 80 to the front of the eyes of the observer, as one group. The image light by a virtual image can be viewed by an observer or a user who wears the virtual image display apparatus 100, and it is possible to allow the observer to view observe an external image in a see-through manner. In the virtual image display apparatus 100, the image display device 80 and the light guiding device 20 are generally provided on either of the right and the left eyes of the observer. However, a case where the apparatus is for the right eye is illustrated here, and the drawings and description of the virtual image display apparatus for the left eye will be omitted because the virtual image display apparatus for the left eye is merely a horizontally reversed version of the virtual image display apparatus for the right eye. In addition, for example, as illustrated in FIG. 1, the entire virtual image display apparatus 100 has an external appearance in which a small-sized apparatus is installed in a frame of the general glasses. For this reason, in addition to the image display device 80 and the light guiding device 20, the virtual image display apparatus 100 includes: a frame portion 102 which supports the light guiding device 20 that covers the front of the eyes of the observer to be able to be seen through; a part (temple) 104 which is extended backward from both right and left ends of the frame portion 102; and an exterior member 105d in a cover shape which covers the image display device 80 or the like provided at a part across the temple 104 from both right and left ends of the frame portion 102. In addition, the virtual image display apparatus 100 has a small-sized camera CA which can perform an imaging operation on a side part.

Hereinafter, an external appearance of the virtual image display apparatus 100 will be described. As illustrated in the drawing, the frame portion 102 which is provided in the virtual image display apparatus 100 includes a frame 107 disposed on an upside thereof and a protector 108 disposed on a downside thereof. In the frame portion 102, the frame 107 disposed above is a member in an elongated plate shape which is bent in a U shape on an XZ surface, and includes: a front surface portion 107a which extends in a right-and-left horizontal direction; and a pair of side surface portions 107b and 107c which extends in a front-and-rear depth direction. The frame 107, that is, the front surface portion 107a and the side surface portions 107b and 107c, is an integrated component made of a metal which is formed of various metal materials in addition to aluminum die casting. A width of the depth direction (Z direction) of the front surface portion 107a is sufficiently thicker than a thickness or a width of the light guiding device 20. The protector 108 which is disposed on the downside of the frame portion 102 is a member in an under rim shape, and is fixed to be disposed on a downside of the frame 107. The protector 108 is a member in an elongated plate shape which is bent, and is integrally formed of the metal material or a resin material.

The frame 107 not only supports the light guiding device 20, but also cooperates with the cover-shaped exterior member 105d which covers a part of the light guiding device 20 or the image display device 80, and has a role of protecting the light guiding device 20 or the image display device 80 which is accommodated inside the exterior member 105d. In addition, the frame 107 and the protector 108 are apart from or loosely connected with an elliptical peripheral part of the light guiding device 20. For this reason, even when there is a difference in coefficients of thermal expansion between the light guiding device 20 at the center and the frame portion 102 which includes the frame 107 and the protector 108, an expansion of the light guiding device 20 is allowed in the frame portion 102, and it is possible to prevent distortion, modification and damage to the light guiding device 20 from occurring.

A nose reception portion 40 is provided accompanying the frame 107. The nose reception portion 40 has a role of supporting the frame portion 102 by abutting against the nose of the observer. In other words, the frame portion 102 is disposed in front of the face of the observer by the nose reception portion 40 which is supported by the nose and a pair of temples 104 which is supported by the ears. In the front surface portion 107a of one frame 107 which constitutes the frame portion 102, the nose reception portion 40 is fixed by screwing so as to be nipped at the center portion of the protector 108 on the other side which constitutes the frame portion 102. In addition, the external appearance illustrated with reference to FIG. 1 as described above is an example. Among mechanisms which are fixed by screwing, for example, a place or the like which is not directly involved as an optical mechanism can appropriately change the design thereof.

Figure 2:
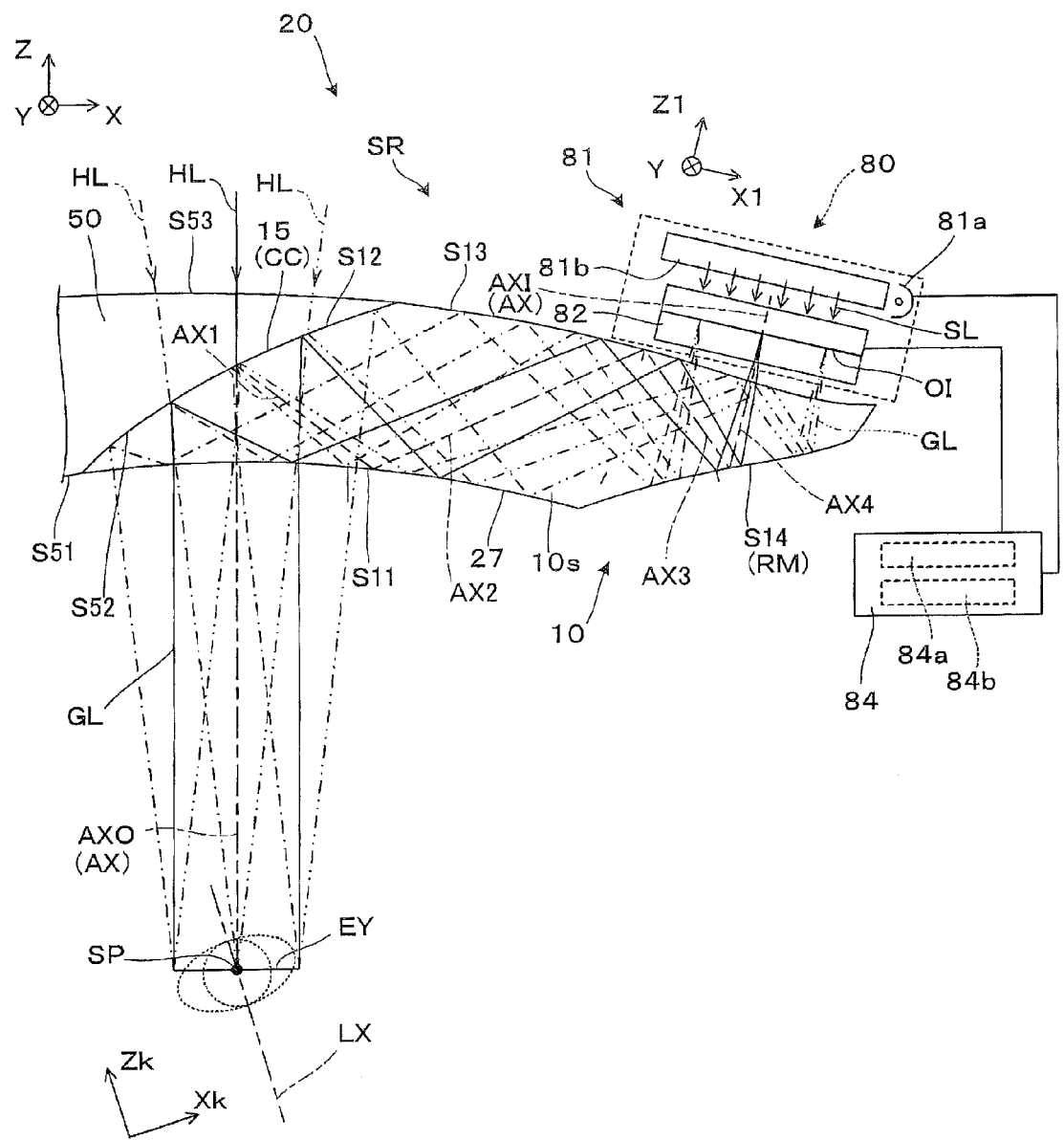
FIG. 2 is a cross-sectional view in a planar view of a main body part which constitutes the virtual image display apparatus.

Hereinafter, with reference to FIG. 2, functions and operations related to the image display device 80 and the light guiding device 20 will be described in detail. In addition, FIG. 2 illustrates a cross section of a reference surface SR including an optical axis AX of the entire optical system in the virtual image display apparatus 100. In other words, the optical axis AX is included in the reference surface SR which is one plane. The optical axis AX is generated from the center of the image display device 80, and is a reference axis which passes through the light guiding device 20 and reaches a reference position SP that is assumed as the center of the eyes EY of the observer. In other words, the optical axis AX corresponds to each optical axis on the optical path of the optical system, and for example, corresponds to an incident side optical axis AXI or an emitting side optical axis AXO which will be described later, when the light is incident or is emitted at the light guiding device 20. Here, as illustrated in the drawing, a right-and-left horizontal direction of the virtual image display apparatus 100 is an X direction, an up-and-down vertical direction is a Y direction, and a front-and-rear direction is a Z direction. Among these, the Y direction is designed to match a direction perpendicular to the observer when the apparatus is mounted. In other words, the Y direction corresponds to the vertical direction which is perpendicular to the horizontal direction in which the eyes of the observer are aligned. In contrast, for example, the Z direction which corresponds to the emitting direction of the video light is not parallel to a Zk direction which is assumed as a direction of a front view to the eyes EY of the observer, and is disposed to be a direction which is axially rotated around the Y direction that is considered as an axis and slightly inclined. According to this, a direction which corresponds to the X direction is also not parallel to the Zk direction. In addition, although there will be detailed description later, an axis which extends in parallel to the direction of the front view (front view direction of the face of the observer) to the eyes EY from the reference position SP which is assumed as the center of the eyes EY, that is, to the Zk direction which is assumed as a direction of the sight line, is a sight line reference axis LX.

The image display device 80 includes: a lighting device 81 which emits illumination light; a video display element 82 which is a transmission type spatial light modulation device; and a driving control portion 84 which controls the operation of the lighting device 81 and the video display element 82.

The lighting device 81 of the image display device 80 includes: a light source 81a which generates three colors, such as red, green, and blue; and a backlight light guiding portion 81b which disperses light from the light source and makes the light into a light flux of a rectangular cross section. The video display element (video element) 82 forms the image light which is formed, for example, by a liquid crystal display device, which is configured by a plurality of pixels, and which is to be a display target of a moving image by spatially modulating the illumination light from the lighting device 81. The driving control portion 84 is provided with a light source driving circuit 84a and a liquid crystal driving circuit 84b. The light source driving circuit 84a supplies an electric power to the lighting device 81 and emits the illumination light having a stabilized luminance. The liquid crystal driving circuit 84b forms the video light or the image light having colors which become bases of the moving image or a still image as a transmittance pattern, by outputting an image signal or a driving signal with respect to the video display element (video element) 82. In addition, it is possible to give an image processing function to the liquid crystal driving circuit 84b, but it is also possible to give the image processing function to an external control circuit. The image display device 80 emits the video light GL which is spatially modulated from the video light SL toward a light incident surface of the light guiding device 20. In addition, a projection optical axis (emitting optical axis) in the image display device 80 is considered as an incident optical axis AXI with respect to the light guiding device 20. In addition, the image display device 80 is disposed on the corner of the eyes side of the observer rather than the emitting position of the video light GL in the light guiding device 20.

The light guiding device 20 is a prism type member which emits the video light GL emitted from the image display device 80 toward the eyes EY of the observer, and is provided with a light guiding member 10 for light-guiding and seeing-through and a light transmitting member 50 for seeing-through. The light guiding member 10 which is a part of the light guiding device 20 is an arc-shaped member which is curved to be along the surface of the face when viewed in a planar view. The light guiding member 10 is a member which guides the video light GL that is incident on the inside of the light guiding device 20 from the image display device 80, and includes a first surface S11, a second surface S12, a third surface S13, and a fourth surface S14, as side surfaces having an optical performance in light-guiding. Among these surfaces, the first surface S11 and the fourth surface S14 are connected to be successively adjacent to each other. In addition, the second surface S12 is disposed between the first surface S11 and the third surface S13.

Hereinafter, each surface which constitutes the light guiding member 10 will be described in detail. In the light guiding member 10, the first surface S11 is a free-form surface which has the emitting side optical axis AXO that is parallel to a Z axis, as a central axis. The second surface S12 is a free-form surface which is included in the reference surface SR (not illustrated) parallel to the XZ surface and has an optical axis AX1 that is inclined with respect to the Z axis, as a central axis. The third surface S13 is a free-form surface which is included in the reference surface SR parallel to the XZ surface and has a bisector, such as a pair of optical axes AX2 and AX3, inclined with respect to the Z axis, as a central axis. The fourth surface S14 is a free-form surface which is included in the reference surface SR parallel to the XZ surface and has a bisector, such as a pair of optical axes AX3 and AX4, inclined with respect to the Z axis, as a central axis. In addition, the above-described first to fourth surfaces S11 to S14 extend laterally (horizontally) and nip the reference surface SR through which the optical axes AX1 to AX 4 pass in parallel to the XZ surface, and have a shape which is symmetrical with respect to a surface in a perpendicular (vertical) Y axis direction.

A main body 10s of a light guiding member 10 is formed of a resin material which shows a high optical transparency in a visible area. For example, the main body 10s is formed by injecting a thermoplastic resin into a mold and hardening the thermoplastic resin. In addition, as a material of the main body 10s, it is possible to use a cycloolefin polymer or the like. The main body 10s can be an integrated formed article. The light guiding member 10 can guide and emit the video light GL, and perform the seeing-through of external light HL.

In the light guiding member 10, the first surface S11 functions as a refracting surface which emits the video light GL to the outside, and functions as a total reflecting surface which totally reflects the video light GL on an inner surface side. The first surface S11 is disposed corresponding to the position of the inclined front view side of the eyes EY, and is made in a concave surface shape with respect to the observer. Here, the emitting side optical axis AXO (optical axis AX), which is the optical axis (central axis) of the first surface S11, is also an emission axis which is the central axis of the video light GL. In other words, the video light GL is emitted to the observer from the first surface S11 of the light guiding member 10 by considering the emitting side optical axis AXO as the central axis. In addition, the first surface S11 is a surface which is formed by a hard coat layer 27 implemented on a surface of the main body 10s.

The second surface S12 is not only the surface of the main body 10s, but also is accompanied by a half mirror layer 15 on the surface. The half mirror layer 15 is a reflecting film (that is, a semi-transmissive reflecting film) having an optical transparency. The half mirror layer (a semi-transmissive reflecting film) 15 is not the entire second surface S12, and is formed on a partial nipped region in a direction in which the second surface S12 is in the perpendicular direction along the Y axis or in a horizontal direction along the X axis (not illustrated). The half mirror layer 15 is formed by forming a metal reflecting film or a dielectric multilayer film, on a partial region on a ground surface of the main body 10s. Reflectivity with respect to the video light GL of the half mirror layer 15 is 10% or greater and 50% or less in an incident angle range of the assumed video light GL, in viewpoint of making the observation of the external light HL in a see-through manner easy. In particular, the reflectivity with respect to the video light GL of the half mirror layer 15 in a specific example is set to be 20%, for example, and transmittance with respect to the video light GL is set to be 80%, for example.

The third surface S13 functions as a total reflecting surface which totally reflects the video light GL on the inner surface side. In addition, the third surface S13 also functions as a refractive surface which causes the video light GL to be incident inside the light guiding member 10. In other words, the third surface S13 functions as a light incident surface which causes the video light GL to be incident on the light guiding member 10 from the outside, and as a reflecting surface which transfers the video light GL on the inside of the light guiding member 10, at the same time. The third surface S13 is disposed corresponding to the position of the inclined front surface side of the eyes EY, and is made in a concave surface shape with respect to the observer similarly to the first surface S11. When the external light HL which passes through the first surface S11 and the third surface S13 is viewed, the visibility is approximately zero. In addition, the third surface S13 is a surface which is formed by the hard coat layer 27 which is implemented on the surface of the main body 10s.

The fourth surface S14 is formed by forming a light reflecting film RM formed of an inorganic material on the surface of the main body 10s, and functions as a reflecting surface.

As described above, in the embodiment, on the inside of the light guiding member 10, the video light from the video display element 82 is guided by four times the reflection from the first surface S11 to the fourth surface S14, including at least two times the total reflection. In addition, any of the surfaces from the first surface S11 to the fourth surface S14 are free-form surfaces. Accordingly, the display of the video light GL and the see-through viewing of the external light HL coexist, and it is possible to perform the correction of the aberration of the video light GL.

The light transmitting member 50 is fixed to be integrated with the light guiding member 10, and is made as one light guiding device 20. The light transmitting member 50 is a member (auxiliary optical block) which supports the transmission function of the light guiding member 10, and includes a first transmitting surface S51, a second transmitting surface S52, and a third transmitting surface S53 as side surfaces having an optical performance. Here, the second transmitting surface S52 is disposed between the first transmitting surface S51 and the third transmitting surface S53. The first transmitting surface S51 is on a surface which extends the first surface S11 of the light guiding member 10, the second transmitting surface S52 is a curved surface which is integrated to be bonded by an adhering layer CC with respect to the second surface S12, and the third transmitting surface S53 is on a surface which extends the third surface S13 of the light guiding member 10. Among these, since the second transmitting surface S52 and the second surface S12 of the light guiding member 10 are integrated by being bonded via the thin adhering layer CC, the shapes of curvature thereof are substantially the same.

The light transmitting member (auxiliary optical block) 50 shows a high optical transparency in a visible area, and the main body part of the light transmitting member 50 is formed of a thermoplastic resin material having substantially the same refractive index as the main body 10s of the light guiding member 10. In addition, after bonding the main body part to the main body 10s of the light guiding member 10, as a film is formed by the main body 10s in a bonded state and the hard coat, the light transmitting member 50 is formed. In other words, similarly to the light guiding member 10, in the light transmitting member 50, the hard coat layer 27 is made on the surface of the main body part. The first transmitting surface S51 and the third transmitting surface S53 are surfaces formed by the hard coat layer 27 implemented on the surface of the main body part.

Hereinafter, the optical path of the video light GL or the like in the virtual image display apparatus 100 will be described. The video light GL emitted from the video display element (video element) 82 is incident on the third surface S13 having a positive refracting power, which is provided in the light guiding member 10.

The video light GL, which is incident on the third surface S13 of the light guiding member 10 and passes through the third surface S13, diverges while being radiated and is reflected on the fourth surface S14 having a negative refracting power.

The video light GL reflected on the fourth surface S14 is incident again on the third surface S13. Here, the third surface S13 has a relatively weak positive refracting power with respect to the video light GL, and totally reflects the video light GL. The video light GL which is totally reflected in the third surface S13 is incident on the first surface S11 having a relatively weak negative refracting power and is totally reflected. The video light GL which is totally reflected on the first surface S11 is incident on the second surface S12, but in particular, the video light GL which is incident on the half mirror layer 15 is partially transmitted through the half mirror layer 15, is partially reflected, is incident again on the first surface S11, and passes through the first surface S11. In addition, the half mirror layer 15 operates as a layer having a relatively positive refracting power with respect to the reflected video light GL. In addition, the first surface S11 operates as a layer having a negative refracting layer with respect to the passed video light GL.

The video light GL which passes through the first surface S11 is incident as a light flux which is substantially parallel to the pupil of the eyes EY of the observer or to a position that is equivalent thereto. In other words, the observer observes an image formed on the video display element (video element) 82 by the video light GL as a virtual image. In addition, from being incident on the third surface S13 until being emitted from the first surface S11, the video light GL is guided without forming the intermediate image in the light guiding member 10.

As described above, the video light GL emitted from the first surface S11 reaches the eyes EY of the observer, and the virtual image is recognized. However, in a case of the optical system having the above-described configuration, the position which is obtained as a center of the image is determined by the incident angle of each light flux with respect to the eyes EY of the observer. For example, the observer obtains an image which has the component of the light flux from a central direction of the sight line of the observer, that is, a direction front of the observer, in the front. Therefore, as described above, while the emitting side optical axis AXO (that is, the optical axis AX) which is the optical axis in the first surface S11 is parallel to the Z direction, when the sight line reference axis LX assumed as a sight line axis of the eyes EY of the observer extends in the slightly inclined Zk direction, the center of the image is shifted from the center, to the observer. In addition, in this case, a shift of the horizontal direction (X direction) is generated. Here, as illustrated in the drawing, similarly to the Zk direction corresponding to the Z direction, the direction horizontal to the eyes EY of the observer is an Xk direction corresponding to the X direction. In this case, even when the emitting side optical axis AXO (optical axis AX) is parallel to the Z direction, when viewed from the eyes EY of the observer, the emitting side optical axis AXO generates the component of the horizontal direction. In particular, here, the emitting side optical axis AXO (optical axis AX) is configured to be extended to approach the eyes EY from the outside of the eyes (that is, the corner of the eyes side) with respect to the sight line reference axis LX. Accordingly, the observer recognizes the central position of the image to be viewed as a position which is on a side corresponding to the outside further outward than the center of the sight line, that is, to a +Xk side.

Meanwhile, among the external lights HL, the light which is incident on a +X side rather than the second surface S12 of the light guiding member 10 passes through the third surface S13 and the first surface S11. However, at this time, the positive and negative refracting power is offset and the aberration is corrected. In other words, the observer observes the environment with less distortion through the light guiding member 10. Similarly, among the external lights HL, the light which is incident on a −X side rather than the second surface S12 of the light guiding member 10, that is, the light which is incident on the light transmitting member 50, passes through the third transmitting surface S53 and the first transmitting surface S51 provided in the light transmitting member 50. At this time, the positive and negative refracting power is offset and the aberration is corrected. In other words, the observer observes the environment with less distortion through the light transmitting member 50. Furthermore, among the external lights HL, the light which is incident on the light transmitting member 50 which corresponds to the second surface S12 of the light guiding member 10 passes through the third transmitting surface S53 and the first surface S11. At this time, the positive and negative refracting power is offset and the aberration is corrected. In other words, the observer observes the environment with less distortion through the light transmitting member 50. In addition, the second surface S12 of the light guiding member 10 and the second transmitting surface S52 of the light transmitting member 50 have substantially the same shape of the curved surface, and a void of the second surface S12 and the second transmitting surface S52 is filled with the adhering layer CC having substantially the same refractive index. In other words, the second surface S12 of the light guiding member 10 or the second transmitting surface S52 of the light transmitting member 50 does not operate as a refracting surface with respect to the external light HL.

However, the external light HL which is incident on the half mirror layer 15 is partially reflected while being partially transmitted through the half mirror layer 15. For this reason, the external light HL from a direction which corresponds to the half mirror layer 15 weakens by the transmittance of the half mirror layer 15. Meanwhile, since the video light GL is incident from the direction which corresponds to the half mirror layer 15, the observer observes the image formed on the video display element (video element) 82 in a direction of the half mirror layer 15 and observes the environment.

Among the video lights GL which are transferred inside the light guiding member 10 and incident on the second surface S12, the light which is not reflected on the half mirror layer 15 is incident on the inside of the light transmitting member 50. However, the light is prevented from returning to the light guiding member 10 by a reflection prevention portion (not illustrated) provided in the light transmitting member 50. In other words, the video light GL which passes through the second surface S12 is prevented from returning to the optical path and becoming stray light. In addition, the external light HL which is incident from the light transmitting member 50 side and reflected on the half mirror layer 15 is returned to the light transmitting member 50. However, the light is prevented from being emitted to the light guiding member 10 by the above-described reflection prevention portion (not illustrated) provided in the light transmitting member 50. In other words, the external light HL which is reflected on the half mirror layer 15 is prevented from returning to the optical path and becoming stray light.

Figure 3:
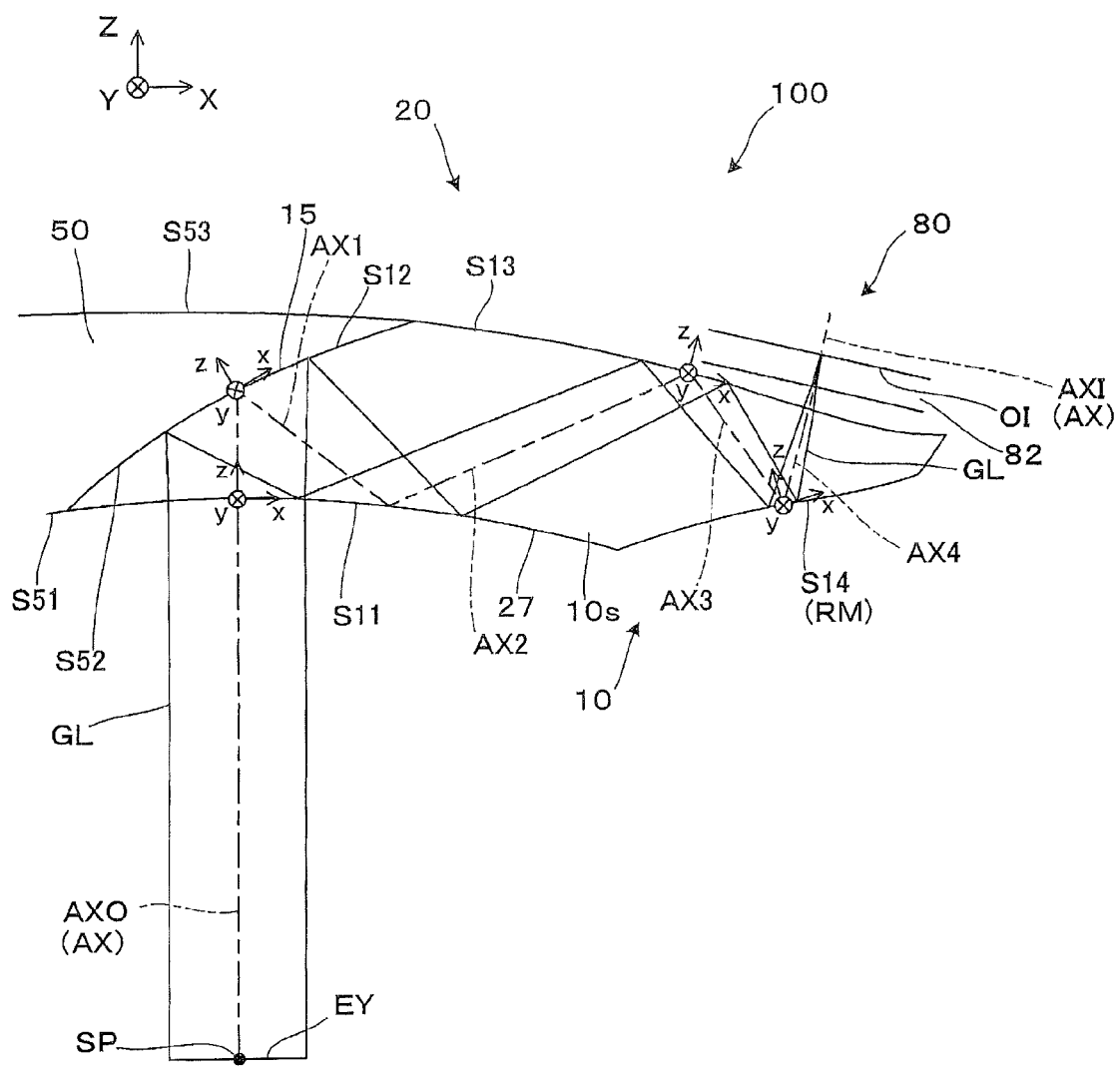
FIG. 3 is a cross-sectional view illustrating an optical surface or an optical path in a light guiding member in the virtual image display apparatus.

FIG. 3 is a view illustrating the optical axes AX1 to AX4 in the light guiding member 10 or local coordinates. In the description below, considering convenience of evaluation or expression of the optical system, in a backward direction toward the video display element 82 of the image display device 80 from the eyes EY of the observer, the optical surface or the optical path is defined. In a real optical system, the light generated from the video display element 82 passes through the inside of the light guiding member 10 sequentially, and reaches the eyes EY. However, in this state, it is difficult to evaluate the optical system. For this reason, the light from an infinitely distant light source through an iris which is at a position of the eyes EY is evaluated and designed as the light which forms an image in the video display element 82 through the light guiding member 10, and the data of the optical system described below is also displayed sequentially. In addition, the light transmitting member 50, which is bonded to the light guiding member 10 and used as one body, is a member which extends the shape of the light guiding member 10, and the description thereof will be omitted.

In the light guiding member 10 illustrated in the drawing, the optical axis of the first surface S11 matches the emitting side, optical axis AXO, and the local coordinates (x, y, z) of the first surface S11 are in a relationship of moving forward together with the general coordinates (X, Y, Z), and have an origin on the first surface S11. In other words, a z direction of the local coordinates is on the emitting side optical axis AXO, and is a forward direction (backward direction of the light ray). A y direction of the local coordinates is parallel to the Y direction of the general coordinates. Even in each of the following drawings, the y direction of the local coordinates is parallel to the Y direction of the general coordinates.

The optical axis of the second surface S12 is appropriately inclined with respect to the emitting side optical axis AXO.

The local coordinates of the second surface S12 appropriately rotate around the Y axis with respect to the general coordinates, move toward, together with each other, and have the origin on the second surface S12. The z direction of the local coordinates of the second surface S12 is an intermediate direction between the emitting side optical axis AXO and the optical axis AX1 of the center of the light flux toward the first surface S11 from the second surface S12.

The origin of the local coordinates of the third surface S13 is on the third surface S13, and is at a position shifted from the emitting side optical axis AXO in the +X direction. In addition, the z direction of the local coordinates of the third surface S13, that is, the optical axis of the third surface S13, is a bisector between the optical axis AX2 of the center of the light flux toward the third surface S13 from the first surface S11 and the optical axis AX3 of the center of the light flux toward the fourth surface S14 from the third surface S13.

According to this, the intermediate direction between the optical axis AX1 of the center of the light flux toward the first surface S11 from the second surface S12 and the optical axis AX2 of the center of the light flux toward the third surface S13 from the first surface S11, matches a normal line direction of the first surface S11 at the center (intersection point of the optical axes AX1 and AX2) of the light flux on the first surface S11. In addition, the intermediate direction between the optical axis AX2 of the center of the light flux toward the third surface S13 from the first surface S11 and the optical axis AX3 of the center of the light flux toward the fourth surface S14 from the third surface S13, matches a normal line direction of the third surface S13 at the center (intersection point of the optical axes AX2 and AX3) of the light flux on the third surface S13.

On the optical path toward the fourth surface S14 following the third surface from the third surface S13, the local coordinates correspond to the forward direction (backward direction of the light ray). In other words, the z direction of the local coordinates across the fourth surface S14 from the third surface S13 matches the optical axis AX3 of the center of the light flux, and the y direction of the local coordinates is parallel to the Y direction of the general coordinates.

The origin of the local coordinates of the fourth surface S14 is on the fourth surface S14. In addition, the z direction of the local coordinates of the fourth surface S14, that is, the optical axis of the fourth surface S14, is a bisector between the optical axis AX3 of the center of the light flux toward the fourth surface S14 from the third surface S13 and the optical axis AX4 of the center of the light flux toward the third surface S13 as the light incident surface from the fourth surface S14.

The shape of the first surface S11 of the light guiding member 10 can be expressed using the local coordinates (x, y, z) of the first surface S11 as follows.

$$z = \Sigma\{A1_{m,n} \cdot (x^m \cdot y^n)\} \quad (4)$$

Here, $A1_{m,n}$ is represented by a coefficient of the m·n term which is polynomially expanded. The m and n are represented by integers which are equal to or greater than 0.

The shape of the second surface S12 of the light guiding member 10 can be expressed using the local coordinates (x, y, z) of the second surface S12 as follows.

$$z = \Sigma\{A2_{m,n} \cdot (x^m \cdot y^n)\} \quad (5)$$

Here, $A2_{m,n}$ is represented by a coefficient of the m·n term which is polynomially expanded.

The shape of the third surface S13 of the light guiding member 10 can be expressed using the local coordinates (x, y, z) of the third surface S13 as follows.

$$z = \Sigma\{A3_{m,n} \cdot (x^m \cdot y^n)\} \quad (6)$$

Here, $A3_{m,n}$ is represented by a coefficient of the m·n term which is polynomially expanded.

In the embodiment, the first to the third surfaces S11 to S13 of the light guiding member 10 satisfy the following three conditions.

$$-10^{-1} < A1_{0,2} + A1_{2,0} < -10^{-3} \text{ and}$$

$$-10^{-1} < A2_{0,2} + A2_{2,0} < -10^{-3} \text{ and}$$

$$-10^{-1} < A3_{0,2} + A3_{2,0} < -10^{-3} \quad (1)$$

$$10^{-3} < |A1_{0,2} - A1_{2,0}| < -10^{-1} \text{ and}$$

$$10^{-3} < |A3_{0,2} - A3_{2,0}| < -10^{-1} \quad (2)$$

$$-10^{-1} < A1_{0,2} < A1_{2,0} < 0 \text{ and}$$

$$-10^{-1} < A3_{0,2} < A3_{2,0} < 0 \quad (3)$$

As the shape of the first to the third surfaces S11 to S13 is set to satisfy the three conditions, it is possible to perform the correction of the aberration of both the external light HL and the video light GL well, and to achieve an excellent image quality.

In addition, the shape of the fourth surface S14 of the light guiding member 10 can be expressed using the local coordinates (x, y, z) of the fourth surface S14 as follows.

$$z = \Sigma\{A4_{m,n} \cdot (x^m \cdot y^n)\} \quad (7)$$

Here, $A4_{m,n}$ is represented by a coefficient of the m·n term which is polynomially expanded.

Figure 4A:
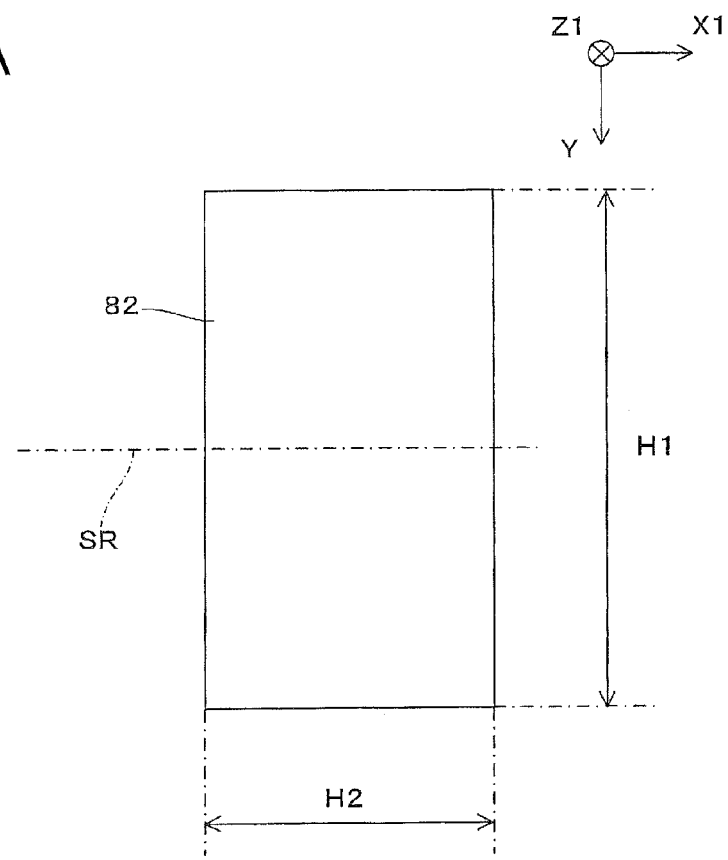
FIG. 4A is a view illustrating an example of an arrangement of a video display element with respect to a reference surface.
Figure 4B:
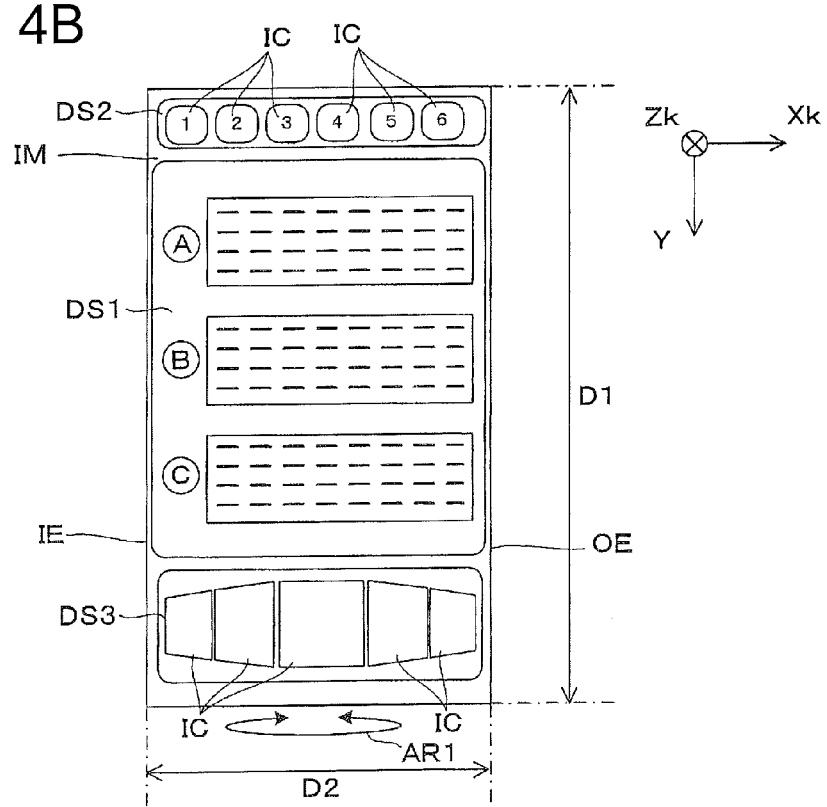
FIG. 4B is a view illustrating an example of a state of an image which is displayed in a state of FIG. 4A.

Hereinafter, an example of a configuration of the video display element 82 which is the video element among the parts described above will be described with reference to the FIGS. 4A and 4B or the like. FIG. 4A is a schematic view illustrating an example of a configuration related to the video display element 82. FIG. 4B is a schematic view illustrating an example of a state of a virtual image to be viewed through the video display element 82 of the configuration of FIG. 4A. In addition, as illustrated in FIG. 4A, the video display element 82 is rectangular when viewed from a front view. Here, a length of a longitudinal direction in the periphery of the rectangular video display element 82 is a long side H1, and the length of a short-length direction is a short side H2. In addition, as can be seen with reference to FIG. 2 or the like, an X1 direction of extension of the short side H2 illustrated in FIG. 4A, the Y direction of extension of the long side H1, and a Z1 direction which is perpendicular to the X1 direction and a Y1 direction, are directions corresponding to the X direction (furthermore, the Xk direction), the Y direction, and the Z direction (furthermore, the Zk direction), respectively. In the example illustrated in the drawing, in the video display element 82, the long side H1 is perpendicular to the reference surface SR which is a symmetrical plane of the optical system. In other words, with respect to the reference surface SR which is parallel to the XZ surface, the long side H1 of the video display element 82 is disposed to be vertically long to be extended along the Y direction. In this case, as illustrated in FIG. 4B, an image IM to be viewed is also formed in a vertically long shape in which a width D1 of the vertical direction (Y direction) which is perpendicular to a direction of alignment of the eyes EY of the observer is longer than a width D2 of the horizontal direction (Xk direction). In addition, regarding information displayed on the image IM, various aspects are considered. However, for example, as illustrated in the drawing, it is possible to display a plurality of partial images or the like including an icon IC or the like as in a plurality of display portions DS1 to DS3. More specifically, for example, the plurality of icons IC is displayed as in the display portion DS1 and is operated according to a selection command from an operation portion (appropriately not illustrated). Accordingly, it is possible to perform the display aligned in the vertical direction by itemizing a plurality of types of character information displays LD as displayed in the display portion DS2. For example, in a case illustrated in the drawing, the information related to the operation order in the display portion DS2 is displayed in three steps of Step A to Step C. The observer appropriately moves the eyes as necessary and sees the content of the display portion DS2. According to this, it is possible for the operation of three steps to sequentially proceed. In addition, regarding the icon IC, in addition to the contents aligned in parallel as in the display portion DS1, for example, as displayed in the display portion DS3, the plurality of icons IC can be displayed in a scrollable state in an arrow AR1 direction, and can be selected according to the command from the operation portion (appropriately not illustrated). As a display range of the image IM is vertically long, for example, it is possible to acquire a wide display range by the itemizing in the display portion DS2, and to ensure a sufficient information amount.

Furthermore, in the embodiment, as described above, the image IM is viewed to be biased to the +X direction in the horizontal direction (X direction). In other words, regarding the display range of the virtual image displayed by the image IM, the central position of the image IM is in a state of being shifted to the outside from the right front view of the eyes EY of the observer. The observer views the video as a video which is positioned to be biased sufficiently to the outside with respect to the direction of the right front view to the observer. In the direction of the right front view, the observer visually views only the environment in a see-through manner.

Figure 5A:
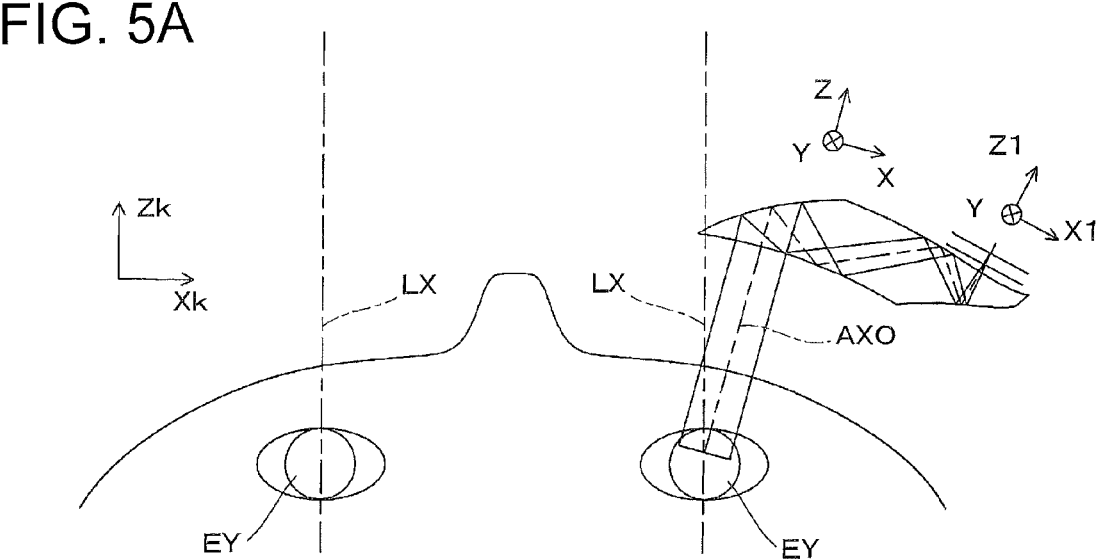
FIG. 5A is a plan view illustrating a positional relationship between the eyes of the observer and the virtual image display apparatus when the apparatus is mounted.
Figure 5B:
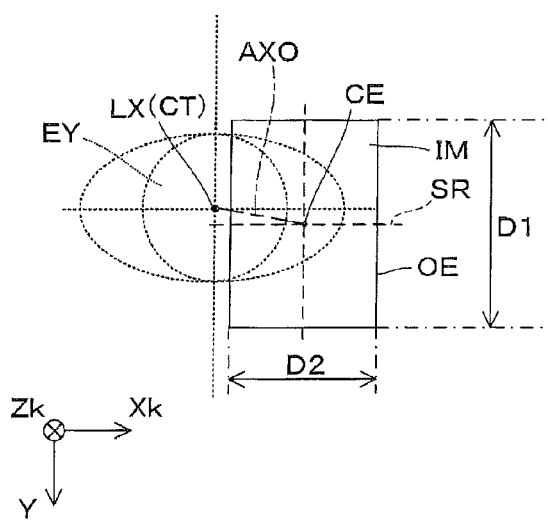
FIG. 5B is a schematic view illustrating a relationship between a position of the eyes of the observer and a position of the virtual image to be viewed.
Figure 5C:
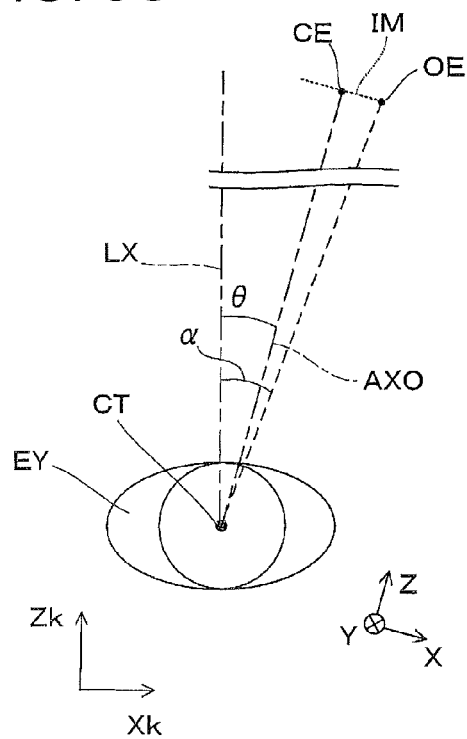
FIG. 5C is a view illustrating an angle of a sight line in a horizontal direction.

FIGS. 5A to 5C are schematic plan views illustrating a relationship between the alignment position of the virtual image display apparatus 100 with respect to the position of the eyes EY of the observer when the apparatus is mounted, and the position of the image, for illustrating the position of the image IM to be viewed. FIG. 5A is a plan view illustrating a positional relationship between the eyes EY of the observer and the virtual image display apparatus 100, and is a view illustrating a positional relationship regarding the XZ surface. FIG. 5B is a schematic view illustrating a relationship between the position of the eyes EY of the observer and a position of the display range of the virtual image to be viewed, that is, a position of the image IM to be viewed, and is a view illustrating the positional relationship regarding the XY surface. In addition, FIG. 5C is a view for illustrating an angle of the sight line with respect to the image IM of the eyes EY of the observer in the horizontal direction (X direction) which corresponds to the alignment of the eyes EY of the observer.

In the example illustrated in FIG. 5A, as described above, in the virtual image display apparatus 100, the direction of the emitting side optical axis AXO which corresponds to the central axis of the video light GL is designed to be inclined with respect to the sight line reference axis LX which is an axis which corresponds to the front view direction of the sight line of the observer. More specifically, as illustrated in the drawing, when the direction of extension of the sight line reference axis LX is the Zk direction, and the direction of the sight line is a +Zk direction, the emitting side optical axis AXO which extends in the +Z direction by facing a +Zk side is in a shifted state to be apart from the sight line reference axis LX. In this case, the observer recognizes that the entire virtual image is at a position shifted to the outside (corner of the eyes side) further outward than the center. In other words, the virtual image display apparatus 100 emits the video light GL via the light guiding device 20 from the video display element 82, from an angle and a position in a state of being shifted to the corner of the eyes side of the observer rather than the sight line reference axis LX, and the image in a state where the display range of the virtual image to be viewed is biased is recognized.

The emitting side optical axis AXO which corresponds to an emission axis of the video light GL as described above is configured to be inclined to emit the video light from the angle and the position in a state of being shifted to the corner of the eyes side of the observer rather than the sight line reference axis LX. As a result, as illustrated in FIG. 5B, when the XY surface or the front view (XkY surface) of the observer which corresponds to the XY surface is viewed, with respect to a central position CT (corresponds to the reference position SP in FIG. 2) of the eyes EY when viewed from a front view, a central position CE of the image IM on an axis of the emitting side optical axis AXO is in a state of being shifted to the corner of the eyes (+Xk side). In other words, the observer recognizes that the entire virtual image is at a position shifted to the outside (corner of the eyes side) from the center. Further, in other words, the virtual image display apparatus 100 recognizes that the display range of the virtual image to be viewed by means of the video light GL via the light guiding device 20 from the video display element 82 is in a state of being biased to the outside. In addition, in a case of an example illustrated in the drawing, the display range of the virtual image displayed by the image IM is also slightly shifted to a −Y side (the emitting side optical axis AXO is inclined so that the central position CT of the eyes EY in the Y direction is raised to be higher than the position of the reference surface SR). However, here, the display range is shifted corresponding to the angle of sight line which is in a relaxed state when the observer closes the eyes, and can be appropriately changed.

In addition, in the description above, when viewed from an angular direction of the sight line in the horizontal direction (parallel direction), that is, the X direction (Xk direction), with reference to FIG. 5C, an angle which is formed by the emitting side optical axis AXO (optical axis AX) which is the emission shift of the video light GL with respect to the sight line reference axis LX, is an angle θ. The angle θ is also called a declination θ. The declination θ is a value illustrating a bias degree in the horizontal direction (parallel direction) of the image IM to the observer. Here, the video light GL is emitted from the angle or the position at which the declination θ is 5° or greater and 30° or less, for example. When the declination θ is set to be in this range, the video is in a state of appropriately being shifted to the outside further outward than the center of the viewing field, the shielding of the viewing field by the video is suppressed when the observer observes the environment, and further, it is possible to immediately receive the provided information by the video when the sight line faces the outside. In addition, in order to adjust the range of the video more appropriately, the video light GL may be emitted from the angle and the position at which the declination θ is 6° or greater and 15° or less, for example, as a more limited range. Furthermore, in the virtual image display apparatus 100, the emission angle in the horizontal direction with respect to the sight line reference axis LX regarding the component of the light flux of the video light GL which corresponds to a boundary OE of the corner of the eyes side of the observer in the display range of the virtual image illustrated by the image IM which illustrates the display range of the virtual image, is a maximum angle (image maximum angle) when the image IM is viewed. The angle is an image maximum angle α. For example, the video light GL can be emitted so that the image maximum angle α is 16° or greater and 24° or less. In a case where the angle α is set to be in this range, it is possible to maintain a state where even every corner is easily obtained when the information by the provided video is viewed, while the shielding of the viewing field is suppressed. In addition, an angle in the horizontal direction with respect to a boundary IE on an eye-head side of the observer is an image minimum angle β.

Figure 6A:
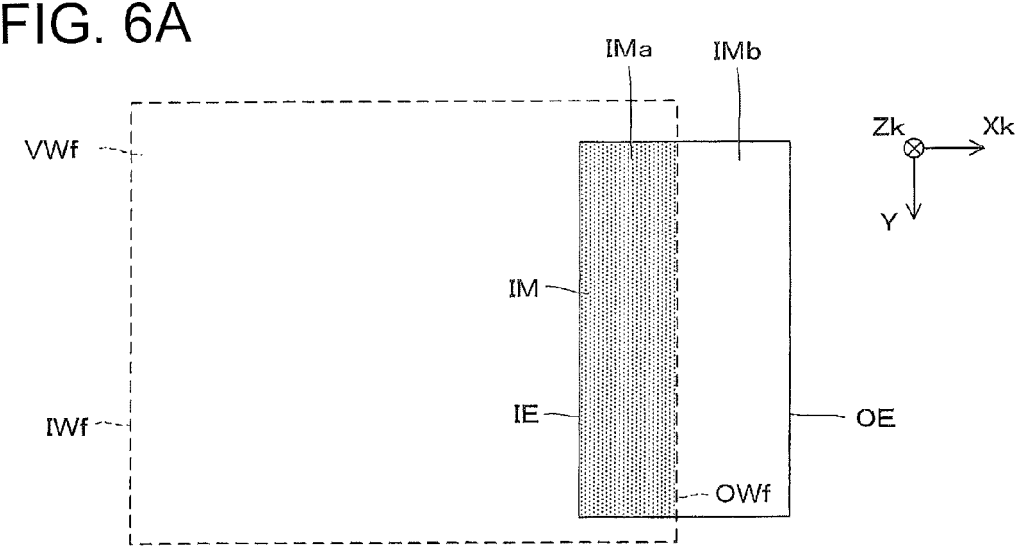
FIG. 6A is a view illustrating an example of a relationship between a viewing field of the observer when viewed from the front view and a display range of the virtual image.
Figure 6B:
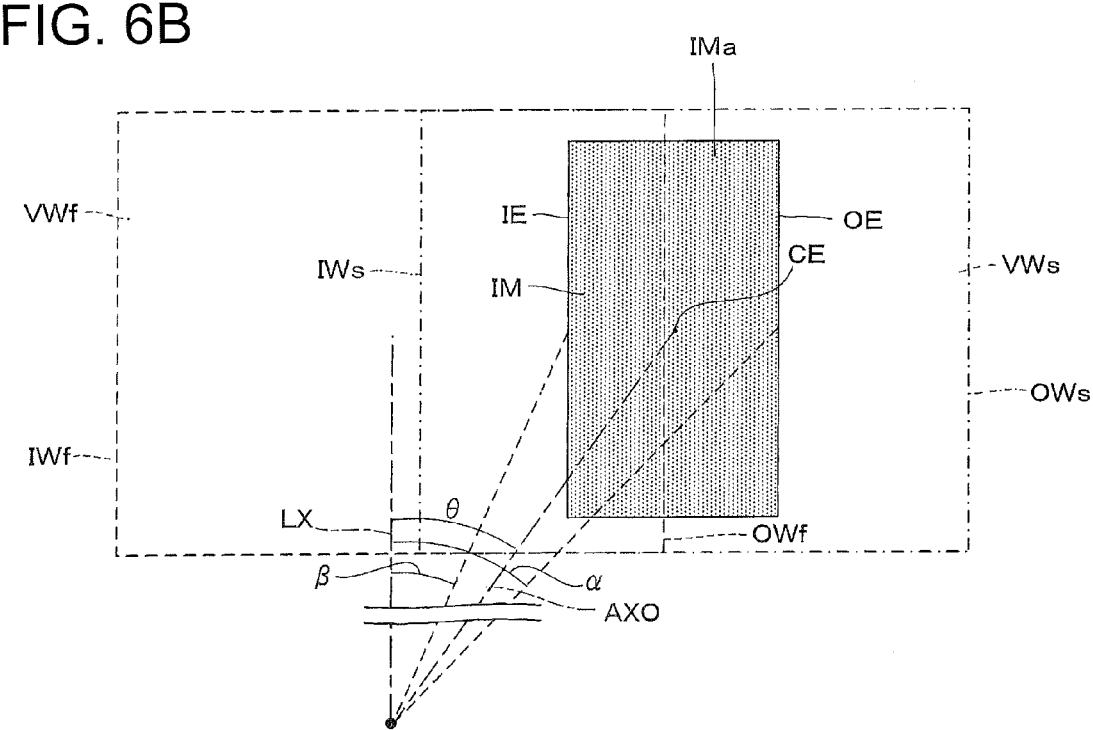
FIG. 6B is a view illustrating a relationship between a viewing field when the eyes are moved toward the outside and the display range of the virtual image.

Hereinafter, with reference to FIGS. 6A and 6B, the relationship between the viewing field of the observer and the display range of the virtual image will be described with an example. The FIG. 6A is a view illustrating an example of the relationship between a range VWf of the viewing field of the observer when viewed from the front view and the image IN which displays the display range of the virtual image. In addition, FIG. 6B is a view for illustrating the relationship between the range VWs of the viewing field when the observer moves the eyes to the outside (+Xk side) and the image IM. In other words, FIG. 6A schematically illustrates a range of a referential viewing field in a state where the observer views from the front view, that is, in a case where the sight line matches the sight line reference axis LX (refer to FIGS. 5A to 5C or the like) which is a standard sight line direction of the assumed reference, as the range VWf illustrated as a dotted line. FIG. 6B schematically illustrates a range of the viewing field in a case where the observer moves the eyes and the sight line is shifted to the outside from the sight line reference axis LX, as the range VWs illustrated as a one-dot chain line. In addition, in FIG. 6B, the range VWs illustrates a standard viewing field in a case where the observer moves the eyes to the maximum limit of the corner of the eyes side (outside). In addition, the boundary of the corner of the eyes side in the range VWF is a right side sight outer edge OWf, and the boundary of the eye-head side in the range VWf is a right side sight inner edge IWf. In addition, the boundary of the corner of the eyes side in the range VWs is a right side sight outer edge OWs, and the boundary of the eye-head side in the range VWs is a right side sight inner edge IWs.

As described above with reference to FIGS. 5A to 5C or the like, the position of the image IM when viewed from the front view by the observer is slightly shifted to the corner of the eyes side, that is, the outside. As described above, the shifted amount is determined by determining the inclination with respect to the sight line reference axis LX of the emitting side optical axis AXO which is the emission axis. However, regarding the extent of the shift, various cases can be considered. In the example illustrated in FIG. 6A, in the range VWf of the standard viewing field when viewed from the front view, a region IMa of a part which is illustrated in a satin pattern (sketch having a low density) in the image IM is included. In other words, the boundary OE on the corner of the eyes side of the image IM is on the outside further outward than the right side sight outer edge OWf, and is out of the range of the viewing field. Furthermore, in the example, as illustrated in FIG. 6B, in the range VWs which is the range of the viewing field moved to the outside, the entire image IM is included in the viewing field (the region IMa illustrated in a satin pattern matches the entire image IM). In other words, in a state of FIG. 6A, only a part of the inside including the boundary IE of the eye-head side in the image IM is included in the viewing field. When the eyes of the observer face the outside, it is possible to allow the observer to view the entire image IM, that is, the entire range from the boundary IE of the eye-head side to the boundary OE of the corner of the eyes side. Accordingly, a state where the video is not displayed in a front view in front of the eyes is maintained, and for example, when any operation is performed, or when the external light which views only the environment is observed, it is possible to suppress the influence of the video light, and to acquire information from the video as necessary.

Figure 7A:
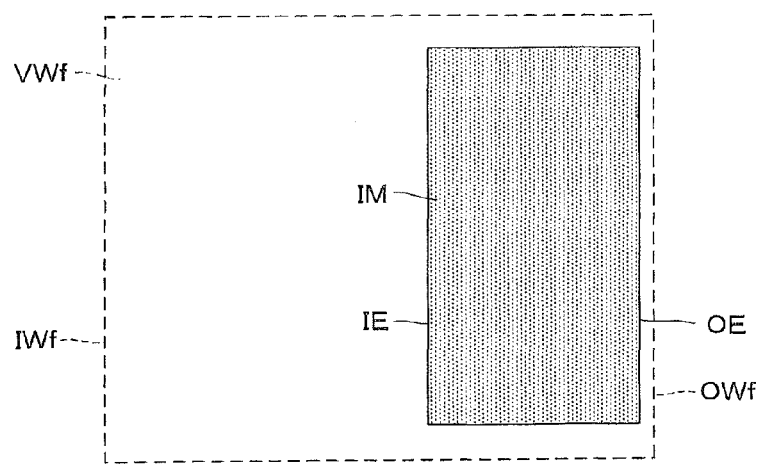
FIG. 7A is a view illustrating another example of the relationship between the viewing field of the observer and the display range of the virtual image.
Figure 7B:
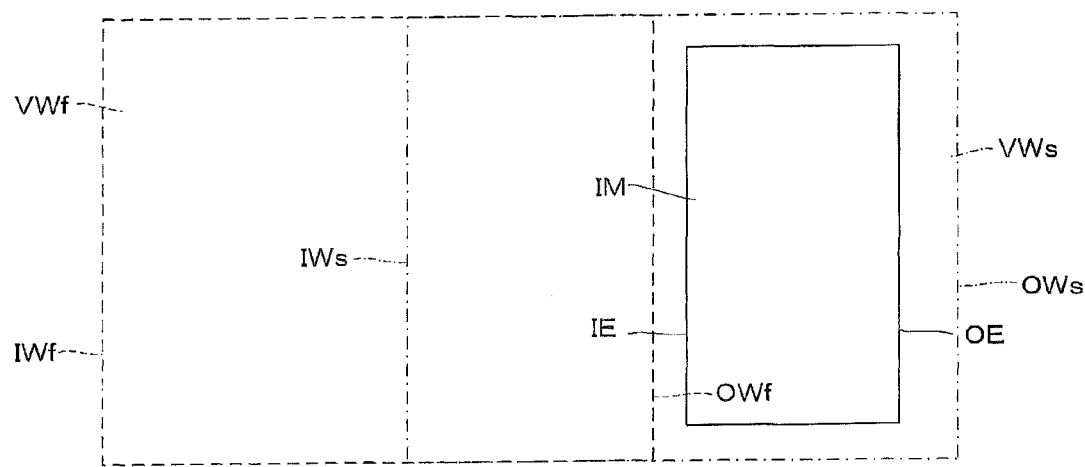
FIG. 7B is a view illustrating still another example of the relationship between the viewing field of the observer and the display range of the virtual image.

In addition, an aspect other than the aspect described with reference to FIGS. 6A and 6B is also considered. FIG. 7A is a view illustrating another example of the relationship between the viewing field of the observer and the display range of the virtual image. In other words, as illustrated in FIG. 7A, in the range VWf of the viewing field when viewed from a front view, the region IMa which is illustrated in a satin pattern in the image IM may match the entire image IM. However, the display range is adjusted so that the image IM is not formed on the central side of the range VWf of the viewing field. In other words, even in a case of FIG. 7A, for example, by ensuring that the image minimum angle β (refer to FIG. 5C or FIG. 6B) which is the angle with regard to the boundary IE of the eye-head side is equal to or greater than a certain extent, it is possible to suppress the influence of the video light at a time of observing the external light. In addition, in contrast to a case of FIG. 7A, as illustrated in FIG. 7B, in the range VWf of the viewing field when viewed from the front view, the image IM is outside the viewing field and is not viewed, and the image IM may be viewed only when the eyes are toward the outside.

As illustrated in FIGS. 5A to 5C or FIGS. 6A and 6B, and 7A and 7B, the range of the image IM is disposed to be biased to the corner of the eyes side (outside), corresponding to the horizontal movement of the sight line. Furthermore, as the image IM is vertically long, that is, as the horizontal direction is relatively short, it is possible to ensure a wide display range while the image IM when viewed from the front view is unlikely to be included in the viewing field.

As described above, in the virtual image display apparatus 100 of the embodiment, with respect to the emitting side optical axis AXO which is the optical axis on the first surface S11 and matches the emission axis which is the central axis that defines the optical path on the emitting side of the emitted video light GL, the sight line reference axis LX which is assumed as the sight line axis of the eyes EY of the observer extends in a slightly declined direction. In particular, the emitting side optical axis AXO is configured to approach the eyes EY from the outside (that is, the corner of the eyes side) of the eyes EY, with respect to the sight line reference axis LX. Accordingly, the observer recognizes the central position of the image to be viewed as a position which is on a side that corresponds to the outside sufficiently further outward than the center of the sight line. Accordingly, for example, when there is a request for a small size and a light weight which is used for so-called watching the video while doing something else, it is possible to provide the information while the shielding of the observation of the environment by the video is suppressed. Furthermore, the image displayed by the above-described virtual image display apparatus is long (vertically long image) in the vertical direction perpendicular to the alignment of the eyes rather than in the horizontal direction which corresponds to the alignment of the eyes. Accordingly, even when there is a request for the small size and the light weight, it is possible to maintain a relatively large display image, and to make it easy to have a sufficient information amount be displayed.

In addition, in general, when there is a strong request for the small size and the light weight of the apparatus, the size of the video display element is also limited, and the size of the display screen, that is, the size of the image, is also limited. According to this, the information amount which can be displayed on the display screen is also limited. In particular, when the video light GL is guided along a direction parallel to the reference surface SR as described above, the limitation in the horizontal direction (X direction) is strict. In order to make the display range wide in the horizontal direction, the light guiding member 10 is required to be thick, for example. In contrast, in the embodiment, the long side H1 of the video display element 82 as described above is perpendicular to the reference surface SR. In other words, as the width of the video display element 82 in a direction along the reference surface SR is disposed to be shortened, it is possible to ensure the size of the display screen and to make much information be displayed, while maintaining the light guiding member 10 to be thin according to the request for the small size. In addition, as illustrated in FIG. 4B, when the vertically long image IM is viewed, it is easy to display much more character information or the like, and it is effective to make the virtual image display apparatus 100 function as an information display terminal.

In addition, in the embodiment, as described above, the light guiding member 10 has four or more curved surfaces (in a case of FIG. 1, four surfaces of the first to the fourth surfaces S11 to S14 are asymmetrical curves surfaces) including three or more asymmetrical curved surfaces. Accordingly, it is possible to sufficiently correct the aberration, and to display an image having a high performance at a wide angle of view. In addition, inside the light guiding member 10, the video light GL is reflected four times in total. More specifically, in a case of one example illustrated in FIG. 1 or the like, the reflection is performed on the fourth surface S14 as the first reflection, the total reflection is performed on the third surface S13 as the second reflection, the total reflection is performed on the first surface S11 as the third reflection, and the reflection is performed on the second surface S12 as the fourth reflection. After that, the video light GL transmits through the first surface, and reaches the eyes of the observer. Accordingly, even when the optical system is small, it is possible to ensure a sufficiently long optical path, and to make the entire apparatus small and light.

Figure 8:
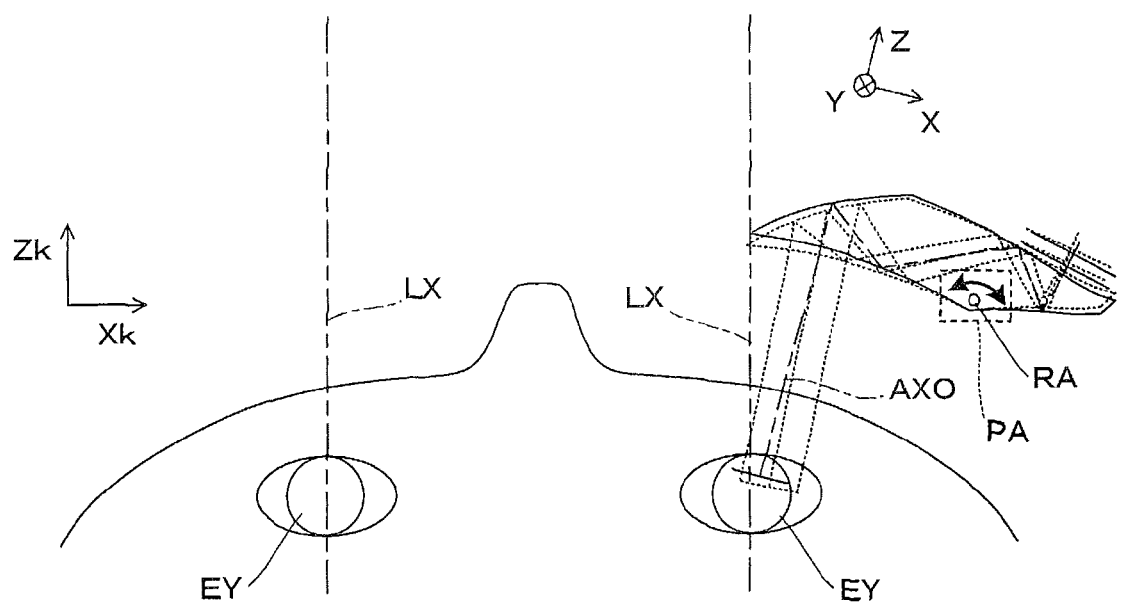
FIG. 8 is a view illustrating a virtual image display apparatus of one modification example having a posture adjustment portion.

FIG. 8 is a view which corresponds to FIG. 5A, and a view illustrating another modification example of the virtual image display apparatus 100 having a posture adjustment portion PA. As illustrated in the drawing, the posture adjustment portion PA in the modification example has a rotating mechanism RA, which rotates the entire optical system of the virtual image display apparatus 100 including the light guiding device 20 around the Y axis, at a position where the optical path of the video light GL is not influenced. By a driving mechanism (not illustrated), the entire optical system of the virtual image display apparatus 100 including the light guiding device 20 can rotate and move around the Y axis. By the adjustment by the rotation and the movement, an emission position of the video light GL moves to the outside (that is, the corner of the eyes side) with respect to the sight line reference axis LX, or moves to the inside, that is, the eye-head side, and it is possible to appropriately change or adjust a state of a field of the viewing field in the horizontal direction (lateral direction).

EXAMPLE

Hereinafter, examples of the light guiding member which is embedded in the virtual image display apparatus according to the embodiment will be described. In each example, the symbols as follows will be used.

EP: Pupil
FFSk: Free-form surface (k of the light guiding member=surface number)
SPH: Spherical surface or plane (protecting glass surface)
IMAGE: Image surface (surface of video element)
θ: Angle between the z axis of the local coordinates of each curved surface and the Z direction of the general coordinates
Nd: Refractive index with respect to a d line of an optical material
Vd: Abbe number in the d line of the optical material Example 1

Data of the optical surface which constitutes the light guiding member of Example 1 is illustrated in Table 1 below. Here, the light ray which moves backward with respect to the forward movement of the video light from the position of the eyes is tracked and measured. The symbol FFSk (k=1 to 4) means the k-th surface among the first to the fourth surfaces S11 to S14 which are the free-form surfaces. In other words, FFS1 means the first surface S11, FFS2 means the second surface S12, FFS3 means the third surface S13, and FFS4 means the fourth surface S14. In addition, the symbol EP means the position of the pupil, that is, the position of the eyes EY. In addition, here, regarding each free-form surface which constitutes the light guiding member, by considering the symbol EP illustrating the position of the pupil as a reference position, that is, an absolute origin with respect to the entire position, a relative positional relationship with the origin of the local coordinates of each surface by the coordinates (XYZ coordinates) for the X axis, the Y axis, and the Z axis, which are the all of the axes, is illustrated. In addition, the directions of respective surfaces are represented by the angle θ which illustrates the angle between the z axis (local z axis) of the local coordinates of each surface and the Z axis of the general coordinates.

TABLE 1

| No | Type | X | Y | Z | θ | Nd | Vd |
|---|---|---|---|---|---|---|---|
| 1 | EP | 0.000 | 0.000 | 0.000 | 0.00 | | |
| 2 | FFS1 | 0.000 | 0.000 | 20.000 | 0.00 | 1.525 | 55.95 |
| 3 | FFS2 | 0.000 | 0.000 | 23.800 | 26.50 | 1.525 | 55.95 |
| 4 | FFS1 | 0.000 | 0.000 | 20.000 | 0.00 | 1.525 | 55.95 |
| 5 | FFS3 | 16.442 | 0.000 | 24.312 | −15.92 | 1.525 | 55.95 |
| 6 | FFS4 | 19.776 | 0.000 | 19.566 | 10.08 | 1.525 | 55.95 |
| 7 | FFS3 | 16.442 | 0.000 | 24.312 | −15.92 | | |
| 8 | SPH | 20.871 | 0.000 | 23.745 | −13.59 | 1.458 | 67.82 |
| 9 | IMAGE | 21.153 | 0.000 | 24.911 | −13.59 | | |

Regarding each optical surface in the light guiding member which constitutes the Example 1, the coefficient $Ak_{m,n}$ which is polynomially expanded on the free-form surface is illustrated in Table 2 below. The coefficient $Ak_{m,n}$ means the coefficient of each term $x^m \cdot y^n$ which constitutes the polynomial expression which represents the k-th surface of interest. In addition, in Table 2, the symbol m, n means a variable or a degree in the coefficient $Ak_{m,n}$. In addition, as described above, the symbol FFSk (k=1 to 4) means the k-th surface among the first to the fourth surfaces S11 to S14 which are the free-form surfaces. In addition, regarding the local coordinates of each surface, the drawing which corresponds to the drawing illustrated in FIG. 3 will be omitted.

TABLE 2

| m | n | FFS1 | FFS2 | FFS3 | FFS4 |
|---|---|---|---|---|---|
| 2 | 0 | −1.216E−02 | −1.545E−02 | −8.157E−03 | −8.776E−03 |
| 0 | 2 | −2.154E−02 | −1.801E−02 | −2.031E−02 | −2.269E−02 |
| 3 | 0 | 5.860E−05 | 1.865E−04 | 3.684E−04 | 2.144E−03 |
| 1 | 2 | −1.138E−04 | −4.989E−05 | −1.502E−04 | 4.815E−04 |
| 4 | 0 | 1.835E−05 | −1.739E−05 | 4.592E−05 | 2.578E−04 |
| 2 | 2 | −2.448E−05 | −1.058E−05 | −1.311E−06 | 9.037E−05 |
| 0 | 4 | 2.726E−05 | 1.822E−06 | 7.530E−06 | 1.009E−05 |
| 5 | 0 | −1.485E−06 | 6.911E−07 | 3.290E−06 | −5.592E−06 |
| 3 | 2 | −8.809E−07 | 2.346E−07 | 4.284E−07 | 6.611E−06 |
| 1 | 4 | −1.337E−06 | −1.083E−06 | −1.572E−06 | −5.948E−06 |
| 6 | 0 | 3.496E−08 | −9.389E−09 | 1.516E−07 | −1.078E−06 |
| 4 | 2 | 3.461E−08 | −7.235E−09 | 6.041E−08 | −1.328E−06 |
| 2 | 4 | −1.831E−07 | 3.073E−08 | −2.111E−07 | −2.688E−07 |
| 0 | 6 | 3.788E−09 | −7.204E−09 | 8.181E−08 | 2.214E−07 |

In Table 2 above and the tables below, the numerical value after E means an exponent part of decimal number, for example, "−1.216E−02" means $-1.216 \times 10^{-02}$.

Figure 9:
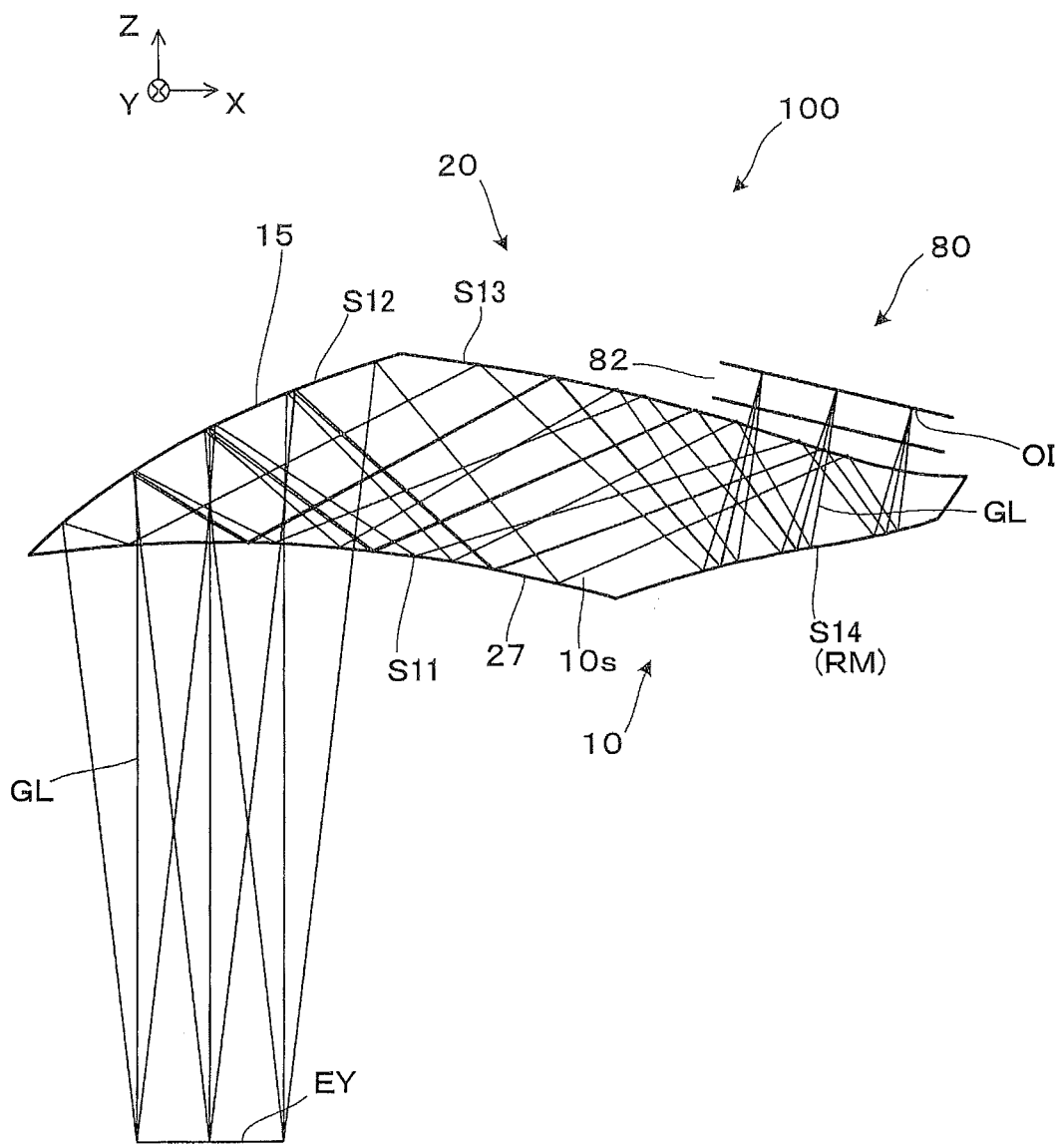
FIG. 9 is a view illustrating an optical system of Example 1.

FIG. 9 is a cross-sectional view of the virtual image display apparatus of the Example 1. However, regarding a luminous flux, only the luminous flux on the reference surface SR will be illustrated. The light guiding member 10 in the virtual image display apparatus 100 includes: the first surface S11 having a weak negative refracting power; the second surface S12 having a relatively strong positive refracting power; the third surface S13 having a relatively weak positive refracting power; and the fourth surface S14 having a negative refracting power. Here, the third surface S13 functions as the reflecting surface and the refracting surface. Specifically, the third surface S13 is a total reflecting surface with respect to the luminous flux (in practice, light from the fourth surface S14) which moves backward from the second surface S12, and is a transmitting surface with respect to the luminous flux (in practice, light from the video display element 82) which moves backward from the fourth surface S14. In other words, the third surface S13 has both a function of bending the optical path and a function of making the luminous flux incident. If detailed specifications of the optical system of the Example 1 are described, a horizontal angle of view is 13.6° and the vertical angle of view is 24.0°. The size of the display region of the video display element is 5.18×9.22 mm, a diameter of the pupil is 5.0 mm, and a focal length is approximately 21.7 mm.

Example 2

Data of the optical surface which constitutes the light guiding member of Example 2 will be described in Table 3 below. The symbol FFSk (k=1 to 4) means the k-th surface among the first to the fourth surfaces S11 to S14 which are the free-form surfaces. In addition, as illustrated in FIGS. 8 and 9, in the embodiment, the light guiding member 10 has the third surface S13 and the fourth surface S14.

TABLE 3

| No | Type | X | Y | Z | θ | Nd | Vd |
|---|---|---|---|---|---|---|---|
| 1 | EP | 0.000 | 0.000 | 0.000 | 0.00 | | |
| 2 | FFS1 | 0.000 | 0.000 | 20.000 | 0.00 | 1.525 | 55.95 |
| 3 | FFS2 | 0.000 | 0.000 | 24.000 | 27.00 | 1.525 | 55.95 |

TABLE 3-continued

| No | Type | X | Y | Z | θ | Nd | Vd |
|---|---|---|---|---|---|---|---|
| 4 | FFS1 | 0.000 | 0.000 | 20.000 | 0.00 | 1.525 | 55.95 |
| 5 | FFS3 | 14.956 | 0.000 | 25.981 | −9.06 | 1.525 | 55.95 |
| 6 | FFS4 | 18.727 | 0.000 | 21.314 | 38.94 | | |
| 8 | SPH | 22.113 | 0.000 | 17.124 | 38.94 | 1.458 | 67.82 |
| 9 | IMAGE | 22.868 | 0.000 | 16.190 | 38.94 | | |

Regarding each optical surface in the light guiding member which constitutes the Example 2, the coefficient $Ak_{m,n}$ which is polynomially expanded on the free-form surface is illustrated in Table 4 below. The coefficient $Ak_{m,n}$ means the coefficient of each term $x^m \cdot y^n$ which constitutes the polynomial expression which represents the k-th surface of interest.

TABLE 4

| m | n | FFS1 | FFS2 | FFS3 | FFS4 |
|---|---|---|---|---|---|
| 2 | 0 | −3.057E−03 | −9.474E−03 | −5.294E−04 | 1.843E−02 |
| 0 | 2 | −1.770E−02 | −1.656E−02 | −6.498E−03 | 2.818E−03 |
| 3 | 0 | 2.370E−04 | −1.432E−04 | −2.323E−04 | −8.800E−04 |
| 1 | 2 | 4.563E−04 | 1.161E−04 | −4.696E−04 | −2.425E−03 |
| 4 | 0 | −2.057E−05 | −1.270E−05 | −5.775E−05 | −1.116E−03 |
| 2 | 2 | −9.470E−05 | −3.952E−05 | −9.681E−05 | −8.609E−04 |
| 0 | 4 | −2.572E−05 | −5.679E−06 | 6.216E−06 | −1.487E−04 |
| 5 | 0 | −4.353E−08 | 1.958E−06 | −2.816E−06 | −1.547E−04 |
| 3 | 2 | 3.821E−06 | 2.876E−06 | −1.579E−06 | −1.017E−04 |
| 1 | 4 | 5.545E−06 | 1.441E−06 | 1.347E−05 | 8.724E−05 |
| 6 | 0 | −1.895E−09 | −1.204E−07 | 8.805E−08 | 8.196E−06 |
| 4 | 2 | −1.606E−07 | −1.665E−07 | −4.215E−07 | −3.025E−05 |
| 2 | 4 | 1.970E−07 | −7.036E−08 | 1.340E−06 | 7.829E−06 |
| 0 | 6 | −1.041E−07 | −6.517E−09 | 3.912E−08 | 2.776E−06 |

Figure 10:
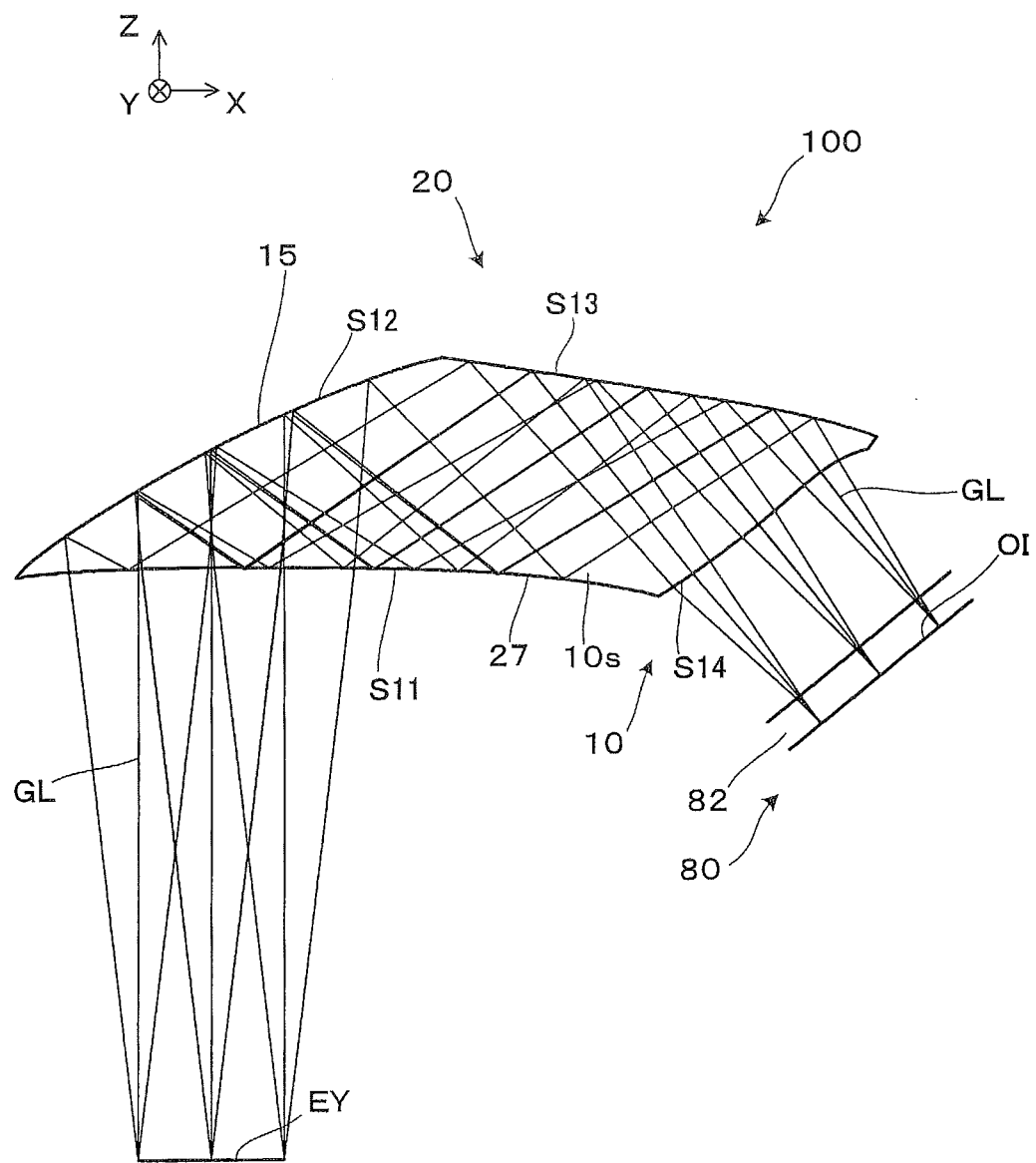
FIG. 10 is a view illustrating an optical system of Example 2.
Figure 11:
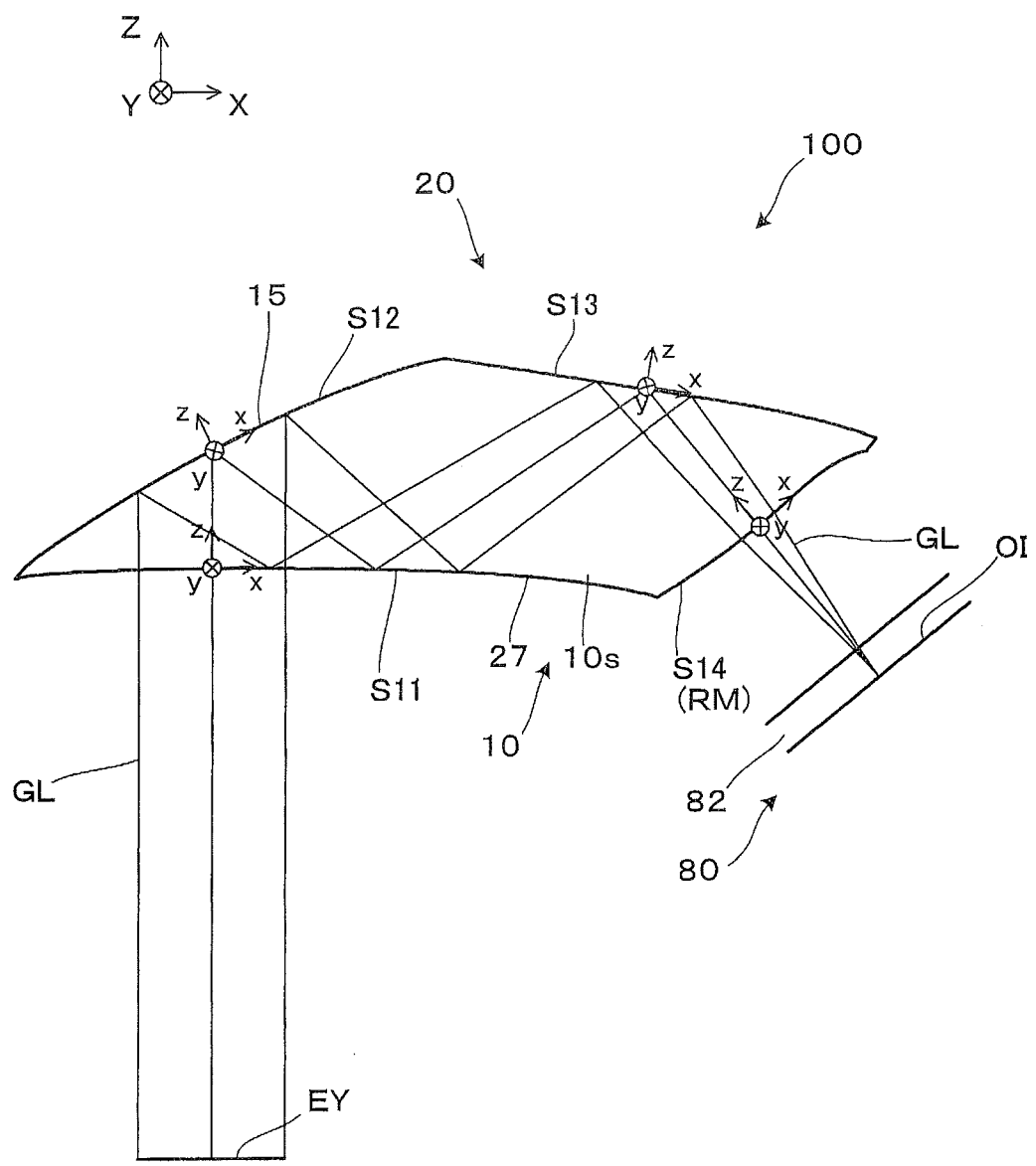
FIG. 11 is a cross-sectional view illustrating an optical surface or an optical path in a light guiding member of Example 2.

FIG. 10 is a cross-sectional view of the virtual image display apparatus of the Example 2. However, regarding the luminous flux, only the luminous flux on the reference surface SR will be illustrated. In addition, FIG. 11 is a view illustrating the local coordinates in the light guiding member. The light guiding member 10 in the virtual image display apparatus 100 includes: the first surface S11 having a weak negative refracting power; the second surface S12 having a relatively strong positive refracting power; the third surface S13 having a relatively weak positive refracting power; and the fourth surface S14 having a negative refracting power. In addition, as illustrated in the drawing, the fourth surface S14 is the light incident surface. Meanwhile, the third surface S13 functions only as the reflecting surface. In other words, in the Example 2, the functions given to the third surface S13 of the Example 1 are divided between the third surface S13 and the fourth surface S14. In addition, in this case, the number of times of reflection on the light guiding member 10 of the video light GL is three, and is one less than in the case of the Example 1. If the detailed specifications of the optical system in the Example 2 are described, a horizontal angle of view is 13.6° and the vertical angle of view is 24.0°. The size of the display region of the video display element is 5.18×9.22 mm, a diameter of the pupil is 5.0 mm, and a focal length is approximately 21.7 mm.

Second Embodiment

Hereinafter, with reference to FIG. 12 or the like, the virtual image display apparatus according to the second embodiment of the invention will be described in detail.

Figure 12:
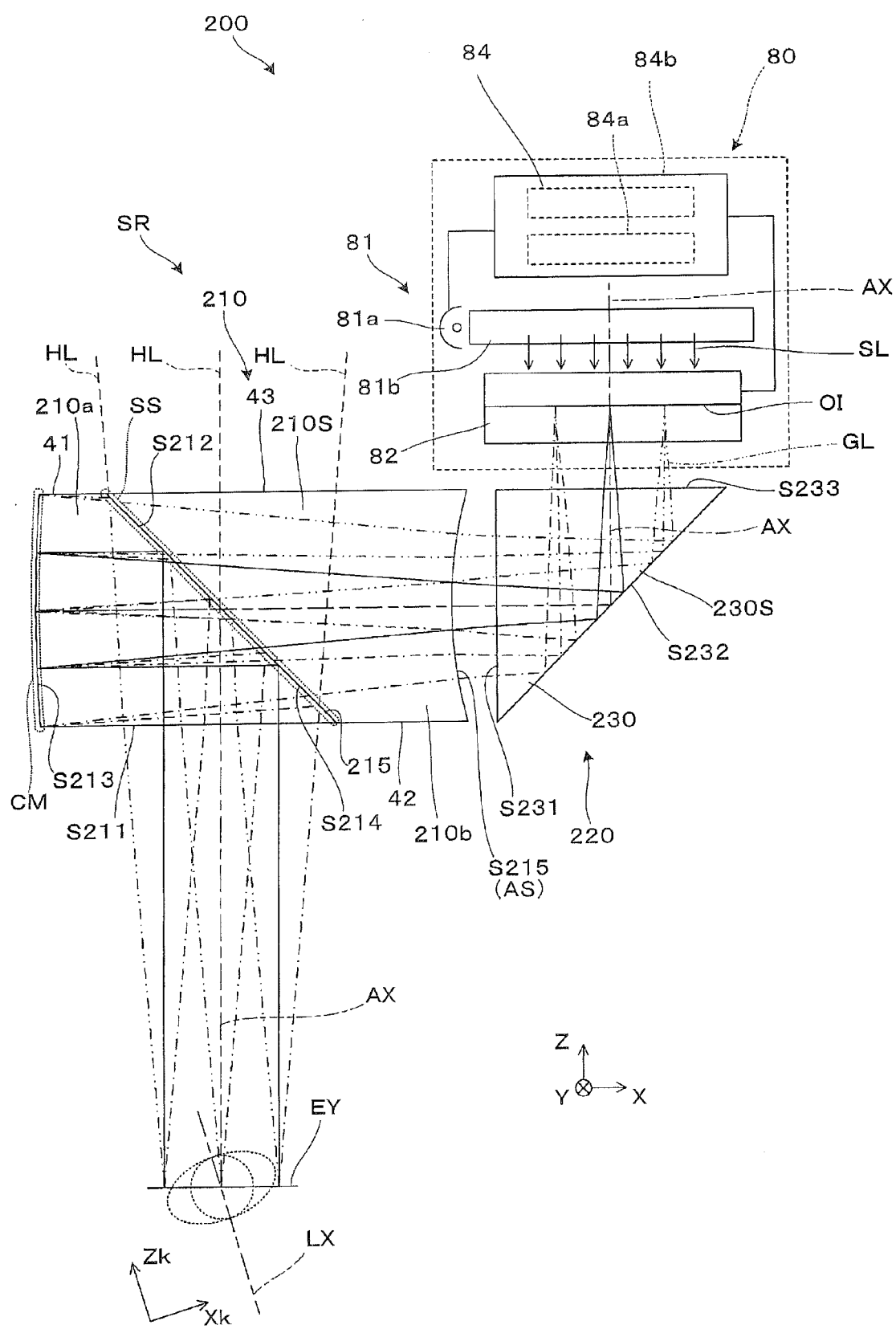
FIG. 12 is a cross-sectional view in a planar view of the main body part of a first display device which constitutes a virtual image display apparatus according to a second embodiment.

A virtual image display apparatus 200 of the embodiment illustrated in FIG. 12 is employed in the head-mounted display (HMD), and includes the image display device 80 and a light guiding device 220 as one group.

Figure 13:
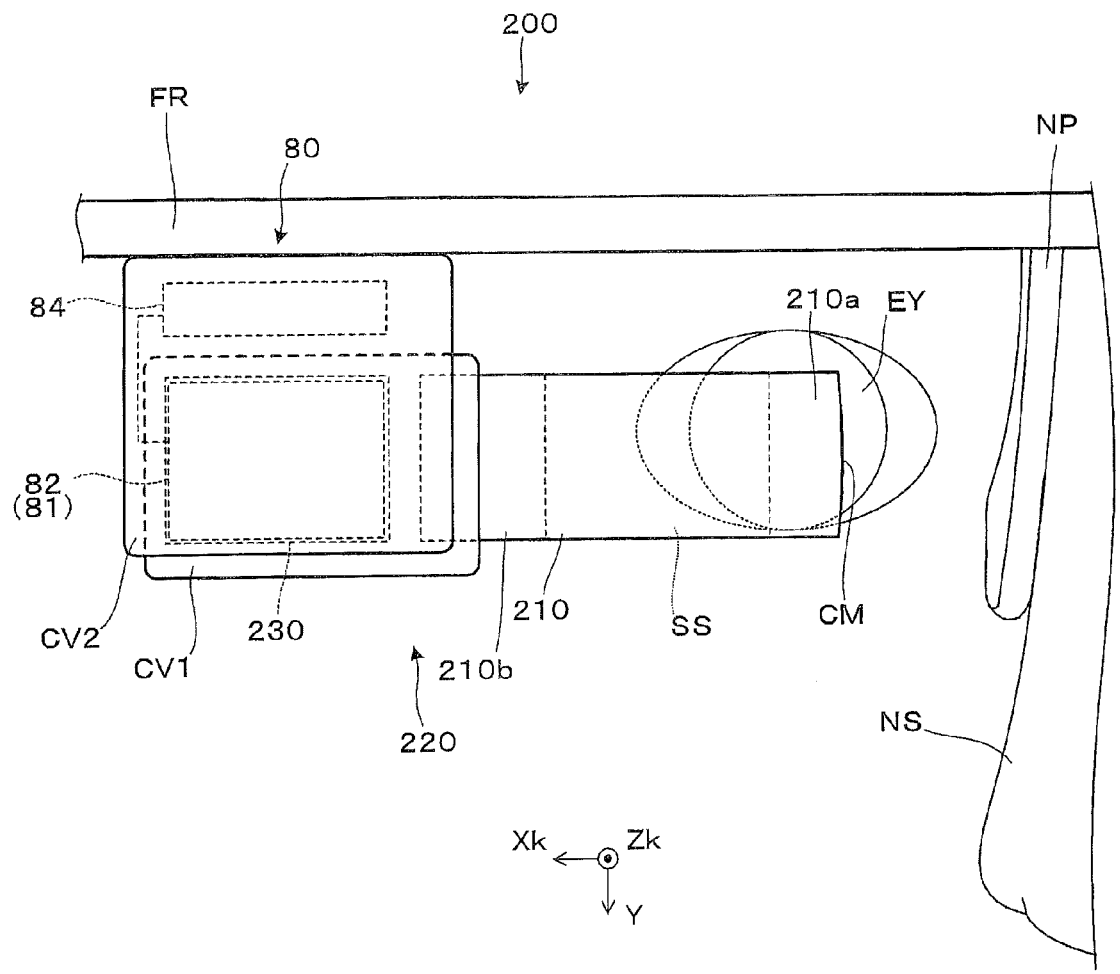
FIG. 13 is a schematic front view illustrating a state where the virtual image display apparatus is mounted.

The virtual image display apparatus 200 makes the image recognized by forming the virtual image by the image light to the observer, and makes the observer observe an external image in a see-through manner. The image display device 80 and the light guiding device 220 are generally provided at either of the right and the left eyes of the observer. However, a case where the apparatus is for the right eye is illustrated here, and the drawings and description of the virtual image display apparatus for the left eye will be omitted because the virtual image display apparatus for the left eye is merely a horizontally reversed version of the virtual image display apparatus for the right eye. In addition, for example, as illustrated in FIG. 13, the entire virtual image display apparatus 200 has an external appearance in which a small-sized apparatus is installed in a frame of the general glasses.

Hereinafter, with reference to FIG. 12, functions and operations related to the light guiding device 220 will be described in detail. In addition, the description of the image display device 80 will be omitted since the image display device 80 is similar to that of the first embodiment illustrated in FIG. 1 or the like. In addition, FIG. 12 illustrates a cross section of the reference surface SR including the optical axis AX of the optical system in the virtual image display apparatus 200.

The light guiding device 220 is a prism type member which emits the video light emitted from the image display device 80 toward the eyes EY of the observer, and includes: a first prism 210 which is the first light guiding member; and a second prism 230 which is the second light guiding member.

In addition, in the first prism 210 and the second prism 230, main bodies 210s and 230s of each of the prisms 210 and 230 are respectively formed of a resin material which shows a high optical transparency in a visible area. For example, the main bodies 210s and 230s are formed by injecting a thermoplastic resin into a mold and hardening the thermoplastic resin. In addition, as a material of the main bodies 210s and 230s, it is possible to use a cycloolefin polymer or the like.

The first prism 210 is a prism type member in a rectangular parallelepiped shape having a curved surface at a part thereof, and is the first light guiding member which is disposed on a center side relatively close to the nose, among the light guiding members that constitute the light guiding device 220. The first prism 210 includes a first block part 210a, a second block part 210b, and a half mirror layer 215. By bonding these to be integrated, the first prism 210 is made to be in one rectangular parallelepiped shape.

Each part that constitutes the first prism 210 will be described in more detail. First, the first block part 210a is a columnar member having a curved surface at a part thereof, and constitutes the part of a tip end side of the first prism 210. When the apparatus is mounted, the first block part 210a is disposed on a side relatively close to the nose, that is, on a light emission side, and includes a first surface S211, a second surface S212, and a third surface S213 as side surfaces having an optical performance. In addition, the first block part 210a includes a side surface 41 which is a plane, as a side surface which does not contribute to guiding the video light. Next, the second block part 210b is a columnar member having a curved surface at a part thereof, and constitutes a base side of the first prism 210, that is, a part of a side close to the second prism 230. When the apparatus is mounted, the second block part 210b is disposed on a side relatively far from the nose, that is, on a light incidence side, and includes a fourth surface S214 and a fifth surface S215 as side surfaces having an optical performance. In addition, the second block part 210b includes side surfaces 42 and 43 which are planes, as side surfaces which do not contribute to guiding the video light. Finally, the half mirror layer 215 is a reflecting film (that is, a semi-transmissive reflecting film) having an optical transparency, is disposed at a position which is in front of the eyes with respect to the eyes EY of the observer when the apparatus is mounted, and is a splitter which transmits and reflects a part of the video light or the external light. Among the surfaces of the first block part 210a and the second block part 210b, the second surface S212 and the fourth surface S214 are surfaces which are disposed facing each other and attached to each other. On these surfaces, the first block part 210a and the second block part 210b cooperate with each other and pinch the half mirror layer 215. A bonding part having the pinched half mirror layer 215 functions as a splitter portion SS which transmits or reflects a part of the video light or the external light that passes through the inside of the first prism 210. In addition, reflectivity or transmittance with respect to the video light of the half mirror layer 215 can be set appropriately, but, for example, the reflectivity may be 50% and the transmittance may be 50%. In other words, when the light passes through one time, half of the components of the video light are transmitted, and the remaining half of the components may be reflected.

In the first prism 210, among the surfaces of the first block part 210a, the first surface S211 is a plane which is disposed at a position right in front of the eyes EY when the apparatus is mounted, and is a light emission surface which emits the video light toward the eyes EY of the observer. The second surface S212 is a plane which makes an angle of 45° with respect to the first surface S211. The third surface S213 has a curved surface shape which is symmetrical with respect to an axis, and has a lens function. For example, in the first prism 210, as a mirror film which is formed by aluminum evaporation or the like on a surface of apart that corresponds to the third surface S213 is implemented, a light collecting mirror portion CM is formed. The third surface S213 functions as a light reflecting surface which reflects the video light by the light collecting mirror portion CM.

In the first prism 210, among the surfaces of the second block part 210b, the fourth surface S214 is an even inclined surface which corresponds to the second surface S212, and as described above, is a surface which cooperates with the second surface S212 and pinches the half mirror layer 215. The fifth surface S215 is a light incident surface which causes the video light from the second prism 230 to be incident. Here, the fifth surface S215 is a spherical surface or an aspherical surface which is symmetrical with respect to an axis (for example, the spherical surface in the example illustrated in FIG. 1), functions as a correction lens surface AS having a function as a lens which corrects the video light, and corrects various types of aberrations, in particular, the chromatic aberration of magnification.

In addition, as described above, the first prism 210 has the side surface 41 or the side surfaces 42 and 43 as other surfaces which do not have an optical performance, in addition to each surface described above. For example, the side surface 41 is a plane which connects the second surface S212 and the third surface S213 of the first block part 210a. The side surfaces 42 and 43 are planes which connect the fourth surface S214 and the fifth surface S215 of the second block part 210b. The side surface 41 is a plane parallel to the first surface S211. The side surface 42 and the side surface 43 are respectively planes which extend the first surface S211 and the side surface 41. In this manner, as each surface is connected to the others, the external appearance of the first prism 210 is in a rectangular parallelepiped shape.

As described above, the first prism 210 bonds each part, which includes the splitter portion SS or the light collecting mirror portion CM, to be integrated. In addition, an outer shape of the first prism 210 is divided by each surface and the first prism 210 is formed as one prism type member having an optical transparency. In addition, in the above-described case, when the apparatus is mounted, while the splitter portion SS is disposed at a part in front of the eyes, the light collecting mirror portion CM is relatively disposed on a nose (not illustrated) side of the observer. In other words, the light collecting mirror portion CM is disposed to nip the splitter portion SS between the video display element 82 and the light collecting mirror portion CM.

The second prism 230 is a prism type member in a triangular pillar shape. Among the light guiding members that constitute the light guiding device 220, the second prism 230 is a second light guiding member which is disposed on a peripheral side relatively far from the nose, and which is disposed between the video display element (video element) 82 and the first prism (first light guiding member) 210. The second prism 230 causes the video light from the video display element 82 to be incident, guides the video light on the inside, and emits the video light toward the first prism 210. In other words, the second prism 230 is an intermediate light guiding member which forms an optical path that connects the video display element 82 and the first prism 210 when guiding the video light. In addition, the second prism 230 includes: a first surface S231 which is a light emitting surface; a second surface S232 which is a reflecting surface that reflects the video light on the inside; and a third surface S233 which is a light incident surface. In the second prism 230, any of the first to the third surfaces S231 to S233 is also a plane, and is a surface which does not have a function as a lens. The first surface S231 is a surface which is parallel to the XY surface, and the third surface S233 is a surface which is parallel to a YZ surface. In other words, the first surface S231 and the third surface S233 are surfaces which are perpendicular to each other. In addition, the second surface S232 is parallel to the Y direction, and is a surface which is inclined by 45° with respect to both the first surface S231 and the third surface S233. In addition, as the mirror film which is formed by aluminum evaporation on the surface of a part that corresponds to the second surface S232 is implemented, the second surface S232 functions as the light reflecting surface which reflects the video light.

Hereinafter, the optical path of video light GL will be described in accordance with the order of the optical path. First, as described above, the video light GL which is formed from video light SL by the image display device 80 relatively disposed on an ear (not illustrated) side of the observer and emitted, is incident from the third surface S233 of the second prism 230 along the optical axis AX, is reflected on the second surface S232 inclined by 45° with respect to third surface S233 and bent, and is emitted toward the first prism 210 from the first surface S231. The video light GL emitted from the first surface S231 of the second prism 230 is incident from the fifth surface S215 which is the light incident surface and the correction lens surface AS among the surfaces of the second block part 210b of the first prism 210, is guided inside the second block part 210b, and is incident on the half mirror layer 215 that constitutes the splitter portion SS from the fourth surface S214. A part of a component of the video light GL passes through the half mirror layer 215, and is incident on the first block part 210a from the second surface S212. The video light GL which is incident on the first block part 210a is guided inside the first block part 210a, is reflected on the third surface S213, and moves toward the second surface S212 again. A part of the component of the video light GL emitted from the second surface S212 is reflected on the half mirror layer 215 and bent, is incident on the first block part 210a from the second surface S212 again, moves toward the first surface S211 of the first block part 210a, and is emitted toward the eyes EY of the observer from the first surface S211. The video light GL passing through the first surface S211 is incident on the pupil of the eyes EY of the observer or an equivalent position, as a substantially horizontal light flux. In other words, by the video light GL as the virtual image, the observer observes the image formed on the video display element (video element) 82.

Each surface on the optical path along the optical axis AX described above is a surface which is symmetrical with respect to the optical axis AX. More specifically, among the surfaces which transmit or reflect the video light GL on the optical path along the optical axis AX, the correction lens surface AS and the third surface S213 (light reflecting surface of the light collecting mirror portion CM) which are curved surfaces having a refracting power are respectively surfaces which are symmetrical with respect to the optical axis AX. In this case, when the video light GL is guided, it is possible to reduce the generation of astigmatism of the image, and further, it is possible to display the formed image at a high definition.

In addition, when the video light GL is guided, the first prism 210 directly guides the video light GL inside the first prism 210 without reflecting the video light GL, on the optical path from the fifth surface S215 which is the light incident surface until the video light GL reaches the light collecting mirror portion CM via the splitter portion SS. Furthermore, the first prism 210 reflects the video light by the light collecting mirror portion CM, and further reflects the video light by the splitter portion SS and emits the video light toward the eyes EY of the observer from the first surface S211 which is the light emitting surface. Even at this time, except for the reflection of the light collecting mirror portion CM, the video light GL is directly guided without being reflected. As the structure which tracks the optical path is simple in this manner, it is possible to reduce the generation of the aberration in accordance with the internal reflection. In addition, at this time, it is possible to reduce the size of the first prism 210, and further, to reduce the size of the entire virtual image display apparatus 200. In this case, for example, as illustrated in FIG. 13, it is possible to reduce a burden in weight applied to the observer when the apparatus is mounted.

However, even in the above-described simple structure, for example, there is a case where the aberration which is called the chromatic aberration of magnification is substantially generated. In particular, in a case of a structure in which the light guiding is performed by the prism of the simple structure which does not have a complicated curved surface like the above-described optical system, as a surface having a lens function, that is, a power, is limited, there is a possibility that the chromatic aberration of magnification or the like cannot be reduced sufficiently. In contrast, in the embodiment, as the fifth surface S215 is given a curvature and functions as the correction lens surface AS, the related problem is solved. In particular, in the embodiment, there is provided the second prism 230 which corresponds to the intermediate light guiding member which is a secondary light guiding member between the first prism 210 that is a main light guiding member and has the correction lens surface AS, and the image display device 80 which forms and emits the video light GL. Accordingly, as the distance of the optical path from the image display device 80 to the correction lens surface AS is ensured to some extent or more, it is possible to sufficiently provide a function as a lens for aberration correction by the correction lens surface AS.

In addition, in the description above, as the third surface S213 is a curved surface having a refracting power, an image by the video light GL is viewed as an image which is enlarged compared to a state where the video light is emitted from the video display element 82.

In addition, in the light guiding device 220, the first prism 210 which is the first light guiding member can guide and emit the video light GL, and external light HL can be seen. Specifically, as described above, by the first block part 210a and the second block part 210b, the first prism 210 is in a rectangular parallelepiped shape, and in particular, a surface which constitutes a part in front of the eyes is a pair of parallel planes. Accordingly, when the external light HL is seen through the first prism 210 from the eyes EY of the observer (for example, when the external light HL is seen through the first surface S211 and the side surface 42), the visibility is zero.

In addition, as an example is schematically illustrated in FIG. 13, in the light guiding device 220, a state where the apparatus is mounted becomes a state where a part of the first prism 210 and the entire second prism 230 are covered with a first protecting member CV1, each part of the image display device 80 is covered with a second protecting member CV2 which is linked to the first protecting member CV1, and the second protecting member CV2 is supported by a frame portion FR. In addition, regarding the supporting and fixing of the frame portion FR or the like in mounting the apparatus, for example, as illustrated in the drawing, as the virtual image display apparatus 200 has a structure in which a nose reception portion NP which extends in a perpendicular direction with respect to the frame portion FR is provided, the apparatus may be supported by the nose NS of the observer. Furthermore, although not illustrated in the drawing, as a spring structure for applying an energizing force or a hook structure for hooking the apparatus to a part of a human body is provided in the frame portion FR, the apparatus may be installed and fixed to the head or the ear of a wearer. In addition, as illustrated in the drawing, as can be found from the position of the eyes EY or the nose NS of the observer, the virtual image display apparatus 200 may be disposed slightly further downward than the center of the eyes. In this case, by setting a sight angle in a relaxed state when the observer closes the eyes, it is possible to adjust so as to observe in a state where a direction of an eye line (sight line) of the observer with respect to the video is naturally a side downward to the observer.

Even in the virtual image display apparatus 200 of the embodiment, when the apparatus is used for so-called watching the video while doing something else, it is possible to provide information while the shielding by the video is suppressed. As the image is a vertically long image which is perpendicular to the alignment of the eyes, even when there is a request for the small size and the light weight, it is possible to maintain a relatively large display screen, and to make it easy to have a sufficient information amount be displayed.

In addition, in a case illustrated in FIG. 13, in the light guiding device 220, the first prism 210 disposed at a part in front of the eyes covers the front of the eyes EY, that is, a part of the front of the eyes of the observer when the apparatus is mounted, and allows a part in which the front of the eyes is not covered to exist. In this case, even if the first prism 210 is configured not to be in a see-through manner, the observer can observe the environment from the vicinity of the light guiding member. In addition, the description and the illustration in the drawing will be omitted, but in the first embodiment, a part may be covered, and a part which does not cover the front of the eyes may exist.

In addition, the correction lens surface AS which has a function as a lens that corrects the video light may be a spherical surface. However, when the correction lens surface AS is an aspherical surface, it is possible to further improve the correction of the aberration. In addition, it is possible to have a configuration in which a polarization separation element is employed instead of the half mirror layer 215.

Examples

Hereinafter, examples of the light guiding device including a first prism and a second prism which are the light guiding members embedded in the virtual image display apparatus according to the embodiment will be described. Symbols used in each example are as follows.

SPH: Spherical surface

ASP: Aspherical surface (aspherical surface which is symmetrical with respect to an axis)

R: Radius of curvature

T: Interval between the surfaces on an axis

Nd: Refractive index with respect to a d line of an optical material

Vd: Abbe number related to the d line of the optical material

TLY: Optical axis inclination angle)(°) on a cross section (XZ cross section) of a certain surface (there is a case where the TLY changes at front and rear parts of a specified surface)

Example 3

Data of the optical surface which constitutes the light guiding device in the projection and penetration device of Example 3 is illustrated in Table 5 described below. In addition, two SPHs in the table respectively mean the third surface S213 which is the reflecting surface of the first prism 210, and the fifth surface S215 (refer to FIG. 14) which is the correction lens surface AS.

TABLE 5

| No | Type | R | T | Nd | Vd |
|---|---|---|---|---|---|
| 1 | Pupil | ∞ | 20.00 | | |
| 2 | Plane | ∞ | 5.00 | 1.525 | 55.95 |
| 3 | Plane | ∞ | −8.00 | 1.525 | 55.95 |
| 4 | SPH | 57.775 | 16.60 | 1.525 | 55.95 |
| 5 | ASP | 13.661 | 2.00 | | |
| 6 | Plane | ∞ | 5.00 | 1.517 | 64.17 |
| 7 | Plane | ∞ | −5.00 | 1.517 | 64.17 |
| 8 | Plane | ∞ | −2.00 | | |
| 9 | Plane | ∞ | −1.60 | 1.458 | 67.82 |
| 10 | Image surface | ∞ | | | |

Regarding the optical surface in the light guiding member which constitutes the Example 3, the optical axis inclination angle (tilt) TLY in the cross section is illustrated in Table 6 described below.

TABLE 6

| No | Type | TLY (Front of face) | TLY (Rear of face) |
|---|---|---|---|
| 2 | Plane | 0.0 | 0.0 |
| 3 | Plane | 45.0 | 45.0 |
| 4 | SPH | 0.0 | 0.0 |
| 5 | ASP | 0.0 | 0.0 |
| 6 | Plane | 0.0 | 0.0 |
| 7 | Plane | 45.0 | 45.0 |
| 8 | Plane | 0.0 | 0.0 |
| 9 | Plane | 0.0 | 0.0 |

A coefficient of the aspherical surface on the optical surface of Example 2 is illustrated in Table 7 described below.

TABLE 7

| | ASP |
|---|---|
| K | −1 |
| B4 | 7.312E−07 |
| B6 | 5.126E−08 |
| B8 | −8.765E−10 |

In Table 7 described above, the numerical value after E means an exponent part of decimal number. For example, "7.312E-07" means $7.312 \times 10^{-07}$. In addition, symbols K and Bi illustrate a coefficient for specifying the correction lens surface AS (fifth surface S15) which is an aspherical surface. The aspherical surface is specified by a polynomial expression (aspherical surface expression) described below.

$$z = \frac{(1/R) \times h^2}{1 + \sqrt{1 - (K+1) \times (1/R)^2 \times h^2}} + B_4 h^4 + B_6 h^6 + B_8 h^8 + \ldots$$

Here, R is a radius of curvature of each surface, h is a height from the optical axis, K is a constant of the cone on a target lens surface, and Bi (i=4, 6, 8, . . . ) is a high order aspherical surface coefficient of the target lens surface.

Figure 14:
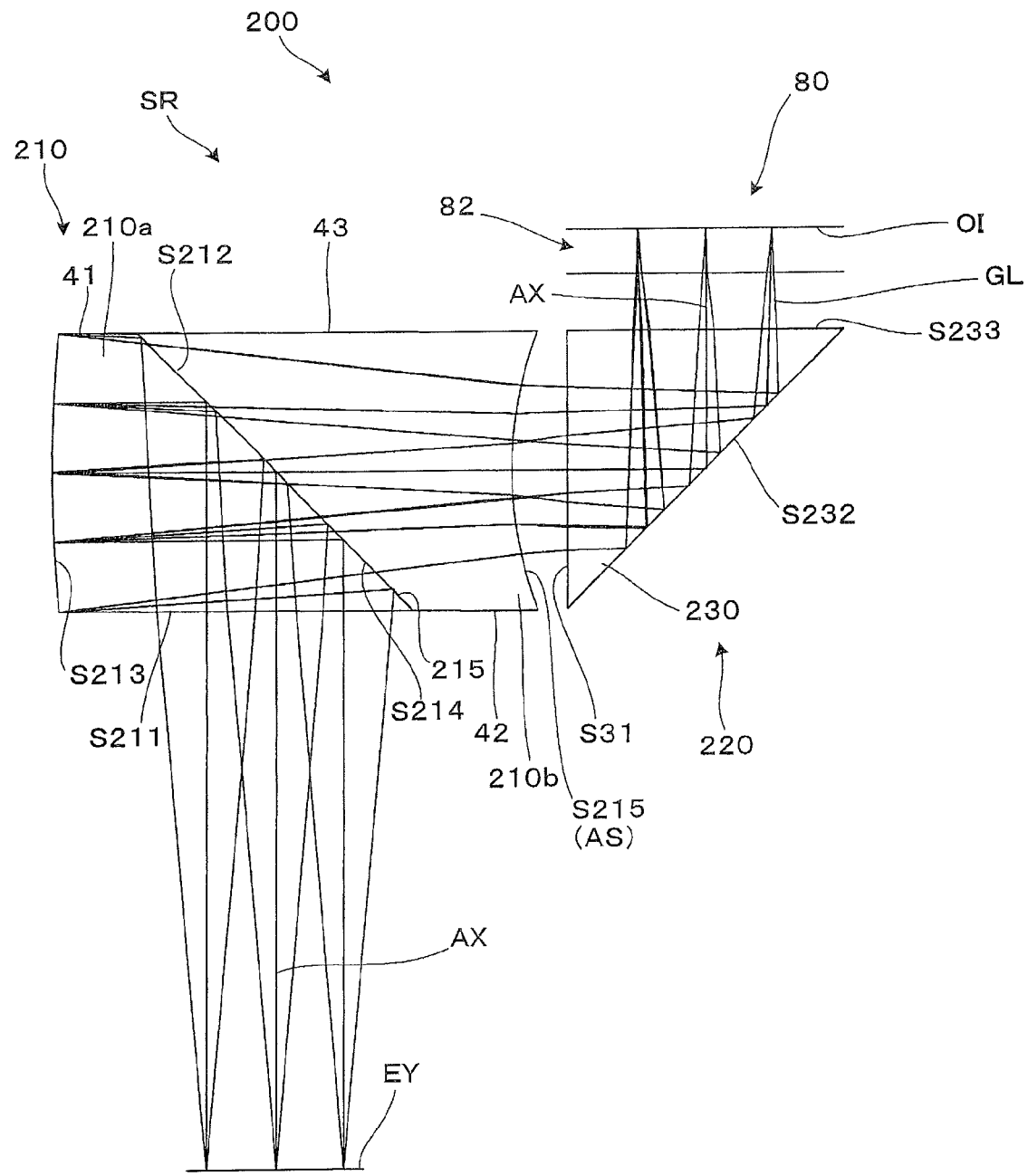
FIG. 14 is a view illustrating an optical system of Example 3.

FIG. 14 is a cross-sectional view of the virtual image display apparatus 200 of the Example 3. In the light guiding device 220 of the virtual image display apparatus 200, the correction lens surface AS (fifth surface S215) of the first prism 210 is an aspherical surface (aspherical surface which is symmetrical with respect to the axis). As the correction lens surface AS is an aspherical surface, the aberration is further reduced. In addition, other surfaces of the light guiding device 220 are planes, except for the third surface S213. In addition, each surface of the second prism 230 is also a plane. If specific specifications of the optical system of the Example 3 are described, a horizontal angle of view is 10°, a vertical angle of view is 6°, a size of a display area of the video display element is 5.6 mm, a pupil diameter is Φ5 mm, and a focal length is approximately 27.5 mm. Other The invention is described according to each of the above-described embodiments, but the invention is not limited to the above-described embodiments. Various embodiments are possible without departing from the scope of the invention. For example, a modification as follows is possible.

In the description above, the distribution of display luminance is not particularly adjusted in the video display element 82, but in a case where a luminance difference is generated according to the position, it is possible to unevenly adjust the distribution of the display luminance.

In the description above, the video display element 82 which is formed of a transmission type liquid crystal display device or the like is used as the image display device 80. However, as the image display device 80, it is possible to use various members without being limited to the video display element 82 which is formed of the transmission type liquid crystal display device or the like. For example, a configuration in which a reflection type liquid crystal display device is used is also possible, and a digital micromirror device or the like can also be used instead of the video display element 82 which is formed of the liquid crystal display device or the like. In addition, it is possible to use a self-luminous type element which is represented by an LED array or an OLED (organic EL), as the image display device 80.

In the above-described embodiment, the image display device 80 which is formed of the transmission type liquid crystal display device or the like is used, but instead, it is possible to use a scanning type image display device.

Figure 15:
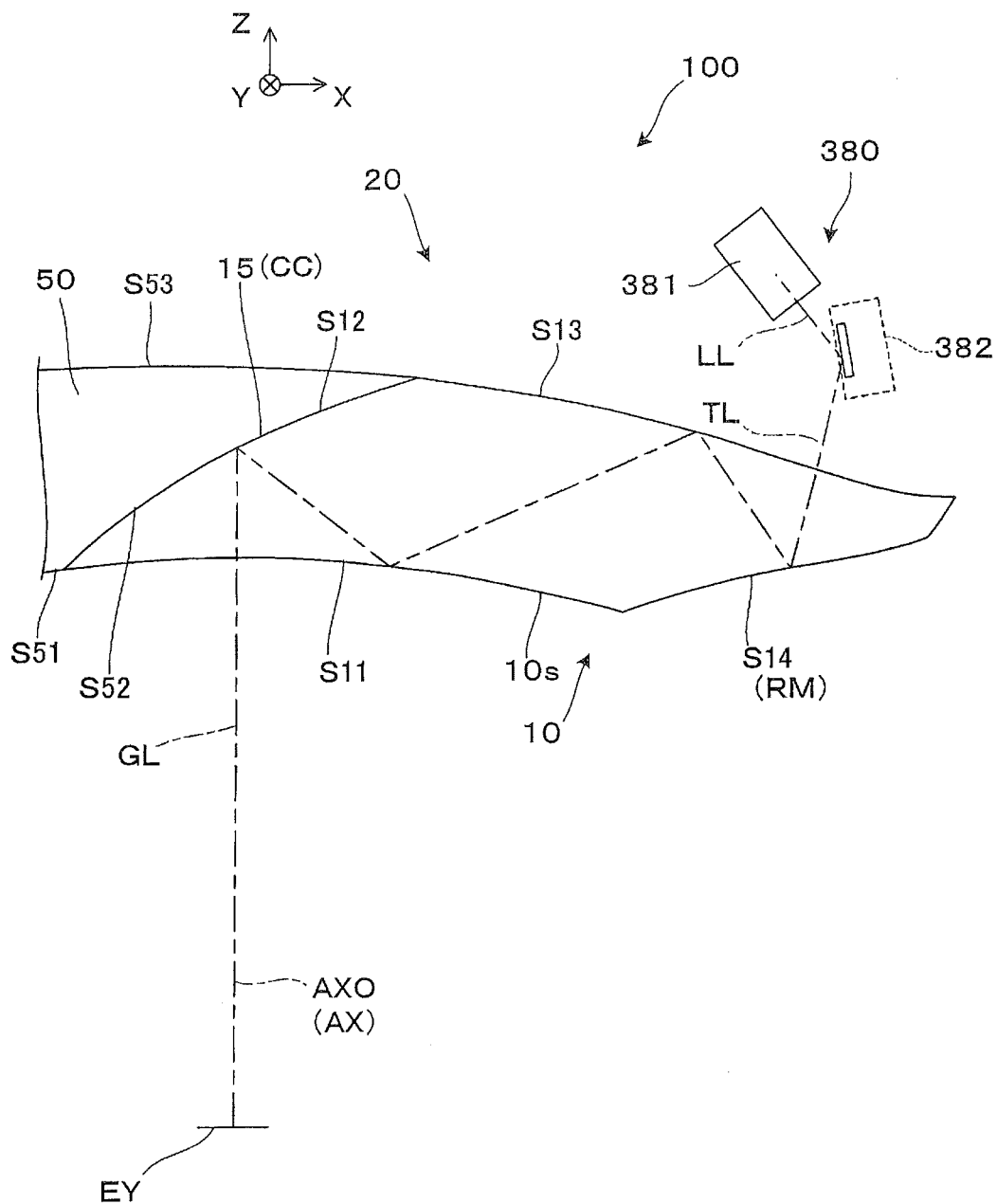
FIG. 15 is a view illustrating the virtual image display apparatus of the modification example.

Specifically, as illustrated in FIG. 15, the virtual image display apparatus 100 is provided with the light guiding device 20 and an image display device 380. Since the light guiding device 20 corresponds to a device in which the light guiding member 10 and the light transmitting member 50 are bonded to each other, the description thereof is omitted here. The image display device 380 is a device which forms an intensity-modulated signal light and emits the signal light as a scanning light TL, and has a signal light forming portion 381 and a scanning optical system 382.

The signal light forming portion 381 has the light source and emits signal light LL which is formed to be modulated based on a control signal from a control circuit (not illustrated). The scanning optical system 382 scans and emits the signal light LL via the signal light forming portion 381. Here, the scanning optical system 382 is configured by a MEMS mirror or the like, and performs two-dimensional scanning by changing an emission angle of the ray of light (scanning light TL) vertically and horizontally by changing a posture to be synchronized with the modulation of the signal light LL by the signal light forming portion 381 and adjusting the optical path of the signal light LL. According to the above, the image display device 380 causes the scanning light TL which should be the video light GL to be incident on the light guiding device 20, and scans the entire region of the part where the half mirror layer 15 is formed on the second surface S12.

When the operation of the virtual image display apparatus 100 illustrated in the drawing is described, as described above, the image display device 380 emits the signal light LL as the scanning light TL toward the third surface S13 which functions as the light incident surface of the light guiding device 20. The light guiding device 20 guides the scanning light TL passed through the third surface S13 to the inside by the total reflection or the like, and makes the light reach the half mirror layer 15. At this time, as the scanning light TL is scanned on a surface of the half mirror layer 15, a virtual image is formed by the video light GL as a track of the scanning light TL. As the wearer obtains the virtual image with the eyes EY, the image is recognized.

In the above-described description, a configuration in which the image is viewed with one eye is described. However, it is possible to provide a configuration in which a pair of right and left display devices is provided. In other words, corresponding to both the right eye and the left eye, the light guiding device 20 and the image display device 80 may be provided as one group. At this time, it is possible to provide the information which is different on the right eye side and on the left eye side.

In the above-described description, the half mirror layer 15 is a simple film (for example, a metal reflecting film or a dielectric multilayer) having semi-transparency. However, the half mirror layer 15 can be replaced with a hologram element of a plane or a curved surface.

In the above-described description, on the first surface S11 and the third surface S13 of the light guiding member 10, the video light is totally reflected and guided by an interface with the air without implementing a mirror or a half mirror on the surface. However, the total reflection in the virtual image display apparatus 100 according to the invention includes a reflection which is performed by forming a mirror coat film or a half mirror film on the entirety of or a part of the first surface S11 or the third surface S13. Examples thereof include even a case where the mirror coat or the like is implemented on the entirety of or a part of the above-described first surface S11 or the third surface S13, and the total image light is substantially reflected, after the incident angle of the image light satisfies the total reflection conditions. In addition, if the image light having a sufficient brightness is obtained, the entire or a part of the first surface S11 or the third surface S13 may be coated by the mirror which has a transparency to a certain extent.

In addition, in the above-described first embodiment, in the half mirror layer 15, the video light GL and the reflectivity with respect to the video light GL are appropriately set in order to realize the see-through manner. However, instead of the half mirror layer 15, by forming the reflecting mirror, without the see-through manner, it is possible to provide a configuration in which the external light HL is blocked. In this case, for example, without disposing the light transmitting member 50 on the outside of the second surface S12, it is possible to provide an aspect in which only the video light GL is suggested to the observer. In this case, since the external light HL and the video light GL are not overlapped, it is possible to suggest an image having excellent contrast. In addition, since only one eye of the observer can block the external light HL, the other eye can constantly view the external field.

In the description above, the light guiding member 10 or the like extends in the horizontal direction in which the eyes EY are aligned, but can be disposed so that the light guiding member 10 extends in the vertical direction. In this case, the light guiding member 10 has a structure in which the light guiding member 10 is disposed in parallel, not in series.

The entire disclosure of Japanese Patent Application No. 2013-249857, filed Dec. 3, 2013 is expressly incorporated by reference herein.

What is claimed is:

1. A virtual image display apparatus, which allows at least any one of the right and the left eyes of an observer to view a virtual image, comprising:
    a video element which generates video light; and
    a light guiding member which guides the video light from the video element toward the eyes of the observer,
    wherein the light guiding member, regarding a display range of the virtual image to be viewed, makes a width in a vertical direction which is perpendicular to a horizontal direction that corresponds to an alignment of the eyes greater than a width in the horizontal direction, and regarding an optical axis which is generated from the video element, passes through the light guiding member, and reaches a reference position that is considered as a center of the pupil of the observer, and a sight line reference axis which passes through the reference position at the pupil center of the observer and is parallel to a direction which is considered as a front view direction of the face of the observer, makes the optical axis to be inclined on a corner of the eyes of the observer rather than the sight line reference axis.

2. The virtual image display apparatus according to claim 1,
    wherein the light guiding member emits the video light from an angle and a position at which an angle formed by the optical axis with respect to the sight line reference axis is 5° or greater and 30° or less.

3. The virtual image display apparatus according to claim 1,
    wherein the optical axis which reaches the center of the pupil of the observer from the center of the video element is included in one plane, and the entire optical system including the video element and the light guiding member is in a symmetrical shape with respect to the plane, and
    wherein the video light which is emitted from the video element via the light guiding member is enlarged and displayed to the observer on a divergent type optical path which does not form an intermediate image.

4. The virtual image display apparatus according to claim 1,
    wherein a posture with respect to the observer of the entire optical system including the video element and the light guiding member is integrally changed, and a posture adjustment portion which adjusts an angle and a position of the video light emitted from the light guiding member is further provided.

5. The virtual image display apparatus according to claim 1,
    wherein the light guiding member has a plurality of surfaces which contributes to guiding the video light, and a first surface and a third surface among the plurality of surfaces are disposed to face each other, and
    wherein, after the video light from the video element is totally reflected on the third surface, is totally reflected on the first surface, and is reflected on a second surface, the video light transmits the first surface and reaches an observation side.

6. The virtual image display apparatus according to claim 5,
    wherein a half mirror is formed on the second surface, the video light is presented to the observer, a light transmission member is disposed to be integrated on an outside of the second surface, a visibility with respect to the external light is approximately zero, and the external light and the video light overlapped with each other are presented to the observer.

7. The virtual image display apparatus according to claim 5,
    wherein a reflecting mirror is formed on the second surface, the video light is presented to the observer, and the external light is blocked.

8. The virtual image display apparatus according to claim 1,
    wherein the light guiding member includes: a splitter portion which transmits and reflects at least a part of the video light from the video element; and a light collecting mirror portion which collects the video light via the splitter portion and folds back the video light to the splitter portion, and the light guiding member emits the video light via the splitter portion and the light collecting mirror portion to an observer side.

9. The virtual image display apparatus according to claim 1,
wherein the optical system including the light guiding member covers a part in front of the eyes of the observer when the apparatus is mounted, and allows a part in which the front of the eyes is not covered to exist.

10. The virtual image display apparatus according to claim 1,
wherein the video element includes: a signal light forming portion which emits modulated signal light corresponding to the image; and a scanning optical system which emits the signal light which is incident from the signal light forming portion as scanning light by scanning the signal light.

* * * * *